(12) United States Patent
Furukawa et al.

(10) Patent No.: US 8,270,613 B2
(45) Date of Patent: Sep. 18, 2012

(54) SYSTEM FOR DISABLING UNAUTHORIZED PERSON, ENCRYPTION DEVICE, ENCRYPTION METHOD, AND PROGRAM

(75) Inventors: Jun Furukawa, Minato-ku (JP); Satoshi Obana, Minato-ku (JP)

(73) Assignee: NEC Corporation, Tokyo (JP)

( * ) Notice: Subject to any disclaimer, the term of this patent is extended or adjusted under 35 U.S.C. 154(b) by 753 days.

(21) Appl. No.: 12/302,734

(22) PCT Filed: May 29, 2007

(86) PCT No.: PCT/JP2007/061249
§ 371 (c)(1),
(2), (4) Date: Nov. 26, 2008

(87) PCT Pub. No.: WO2007/142170
PCT Pub. Date: Dec. 13, 2007

(65) Prior Publication Data
US 2009/0180619 A1    Jul. 16, 2009

(30) Foreign Application Priority Data

May 29, 2006  (JP) ................................. 2006-148825
Jul. 20, 2006  (JP) ................................. 2006-198117
Dec. 13, 2006  (JP) ................................. 2006-335681

(51) Int. Cl.
*H04L 9/00*    (2006.01)
(52) U.S. Cl. ............. 380/277; 726/25; 380/28; 380/278
(58) Field of Classification Search .............. 380/28–30, 380/44, 277, 278; 726/26–28
See application file for complete search history.

(56) References Cited

U.S. PATENT DOCUMENTS
2006/0075506 A1 *  4/2006  Sanda et al. .................... 726/26

(Continued)

FOREIGN PATENT DOCUMENTS
WO   2003/098919 A1   11/2003

OTHER PUBLICATIONS

Dan Boneh, et al., "Fully Collusion Resistant Traitor Tracing With Short Ciphertexts and Private Keys", [online] Cryptolopy ePrint Archive: Report 2006/045, 2006, [Retrieved from the Internet: <URL: http://eprint.iacr.org/2006/045>, especially 4.1 Our Construction, 2.2 Reducing Traitor Tracing to PLBE, pp. 1-29.

(Continued)

*Primary Examiner* — Gilberto Barron, Jr.
*Assistant Examiner* — Malcolm Cribbs
(74) *Attorney, Agent, or Firm* — Sughrue Mion, PLLC

(57) ABSTRACT

A system for disabling an unauthorized person includes an encryption device (400) and a decryption device (500). The encryption device (400) stores distribution member set data, a random number, and a public key, the distribution member set data being information on members who are permitted to decrypt a cyphertext, and generates and distributes, when a shared key is input, an error-containing cyphertext which is a cyphertext containing the shared key, the distribution member set data, and error information different for each of the members, and an error correction cyphertext which is a cyphertext of the error information. The decryption device (500) is connected to the encryption device, stores the public key and a secret key corresponding to the own device, determines, upon reception of the error-containing cyphertext and the error correction cyphertext from the encryption device, whether the own device is included in the distribution member set data, decrypts, if the own device is included in the distribution member set data, the error-containing cyphertext and the error correction cyphertext with the public key and the secret key, and removes the error information from the decrypted error-containing cyphertext to output the shared key.

13 Claims, 12 Drawing Sheets

U.S. PATENT DOCUMENTS

2007/0067242 A1* 3/2007 Lotspiech et al. .............. 705/57

OTHER PUBLICATIONS

Dan Boneh, et al., "A Fully Collusion Resistant Broadcast, Trace, and Revoke System", [online] Cryptolopy ePrint Archive: Report 2006/298, 2006, [Retrieved from the Internet: <URL: http://eprint.iacr.org/2006/298>, especially 4.4 ABE Construction, 2.2.2 Trace and Revoke, pp. 1-30.

V.D. To, et al., "New Traitor Tracing Schemes Using Bilinear Map", Proceedings of the 3 rd ACM workshop on Digital rights management, especially 6. Scheme 3: Providing User Revocation, 2003, pp. 67-76.

Jun Furukawa, et al., "Fully Collusion Resistant Black-Box Traitor Revocable Broadcast Encryption with Short Private Keys", Nen Symposium on Cryptography and Information Security Yokoshu, especially 4 Basic Scheme and Full Scheme, 2007, pp. 1-6.

* cited by examiner

SYSTEM FOR DISABLING UNAUTHORIZED PERSON, ENCRYPTION DEVICE, ENCRYPTION METHOD, AND PROGRAM

This invention is based upon and claims the priority benefit of Japanese patent application No. 2006-148825 filed on May 29, 2006, Japanese patent application No. 2006-198117 filed on Jul. 20, 2006, and Japanese patent application No. 2006-335681 filed on Dec. 13, 2006, the entire contents of which are incorporated herein by reference.

TECHNICAL FIELD

This invention relates to a system for disabling an unauthorized person, an encryption device, a decryption device, an unauthorized person disabling device, an encryption method, a decryption method, a method for disabling an unauthorized person, and a program for causing a computer to carry out those methods, all of which employ a type of encryption which can be decrypted by a plurality of receiving devices.

BACKGROUND ART

A broadcast encryption is a type of encryption in which the same ciphertext is received by a plurality of receivers having secret keys different from each other, and decryption thereof results in the same plaintext.

As a method for disabling an arbitrary member according to a conventional broadcast encryption, there is provided broad cast encryption described in Dan Boneh, Craig Gentry, Brent Waters: Collusion Resistant Broadcast Encryption With Short Ciphertexts and Private Keys, Advances in Cryptology—CRYPTO 2005: 25th Annual International Cryptology Conference, Santa Barbara, Calif., USA, Aug. 14-18, 2005, Proceeding. Lecture Notes in Computer Science 3621 Springer 2005, ISBN 3-540-28114-2, pp. 258-275. This method can generate a ciphertext which can be correctly decrypted only by members belonging to an arbitrary set of initially determined members. A brief description will be given of this type of encryption.

FIG. 11 is a block diagram illustrating an example of a configuration of the conventional broadcast encryption.

A broadcast encryption 100 illustrated in FIG. 11 is intended to be used by an administrator, a ciphertext generator, and a large number of ciphertext receivers. Then, the broadcast encryption 100 includes a setting algorithm 105, an encryption algorithm 108, and a decryption algorithm 110. Processing of those algorithms is carried out respectively by information processing devices corresponding to the respective algorithms.

The administrator uses the setting algorithm 105 to generate a public key 106, and individual secret keys 107 for all the ciphertext receivers (namely, to generate a set of the secret keys for all the ciphertext receivers), and secretly passes the secret keys to the respective ciphertext receivers.

The ciphertext generator determines a message 111 and a set 103 of the ciphertext receivers (distribution member set) to which the message 111 is to be distributed. Then, the ciphertext generator uses the encryption algorithm 108 to generate a broadcast ciphertext 109 from the message 111, the public key 106, and data representing the set 103 of intended receivers of distribution, and broadcasts the generated broadcast ciphertext 109 to all the receivers. It should be noted that the ciphertext 109 includes a description of the receivers who are authorized to carry out the decryption.

While all the receivers receive the ciphertext 109, the receiver decrypts the message in the following way only when the ciphertext describes this receiver as an authorized receiver. The receiver uses the decryption algorithm 110 to restore the message 111 based on the secret key 107 passed to the receiver and the received ciphertext 109 (this ciphertext includes a description of the receivers who are authorized to carry out the decryption).

On the other hand, as a method for tracing unauthorized person employing the conventional broadcast encryption, there is a method for tracing unauthorized person described in Dan Boneh, Amit Sahai, Brent Waters: Fully Collusion Resistant Traitor Tracing With Short Ciphertexts and Private Keys, Advances in Cryptology-EUROCRYPT 2006, Proceedings. Lecture Notes in Computer Science Springer 2006, available on the Internet at URL: http://eprint.iacr.org/2006/045. According to this method, even when members belonging to an arbitrary set of initially determined members get together bringing own secret keys and illicitly duplicate a pirated version of a decryption device, it is possible to, based on this device, identify at least one member who has involved in the production of the pirated version. Especially, in order to identify this member, without necessity of directly investigating a circuit or a program code of the pirated decryption device, it is enough to enter a ciphertext and then to observer the output thereof. A brief description will be given of this type of encryption.

FIG. 12 is a block diagram illustrating another example of a configuration of the conventional broadcast encryption. As illustrated in FIG. 12, a broadcast encryption 200 is intended to be used by an administrator, a ciphertext generator, a large number of ciphertext receivers, and a tracer for unauthorized person. Then, the broadcast encryption 200 includes a setting algorithm 203, an encryption algorithm 208, a decryption algorithm 210, and an algorithm of black box type for tracing unauthorized person 212. It should be noted that processing of the respective algorithms is carried out by an information processing device.

The administrator uses the setting algorithm 203 to generate a public key 204, and individual secret keys 205 for all the ciphertext receivers (namely, to generate a set of the secret keys for all the ciphertext receivers), and secretly passes the secret keys 205 to the respective ciphertext receivers. Moreover, the administrator generates a trace key 206, and gives the algorithm of black box type for tracing unauthorized person 212 the trace key 206.

The ciphertext generator uses the encryption algorithm 208 to generate a broadcast ciphertext 209 from a message 211 and the public key 204, and broadcasts the generated broadcast ciphertext 209 to all the receivers. It should be noted that all the receivers can decrypt this ciphertext 209. The receiver uses the decryption algorithm 210 to restore the message 211 based on the secret key 205 passed to this receiver and the received ciphertext 209.

A case in which a receiver uses the own secret key to illicitly produce a decryption device incorporating the decryption algorithm or a program for the decryption, and passes the produced decryption device or program to another person will now be considered. In the following section, this program or device is referred to as a pirated version.

The tracer for unauthorized person wants to obtain the pirated version, and then to find the unauthorized person who illicitly used the own secret key. However, the tracer for unauthorized person avoids complicated operation such as analyzing the program itself.

The algorithm of black box type for tracing unauthorized person 212 uses the trace key 206 to produce a plurality of special ciphertexts designed to trace the unauthorized person, and sequentially inputs them as ciphertexts to the pirated version. The pirated version tries to decrypt the ciphertexts. However, those special ciphertexts are designed such that a result of the decryption thereof is dependent on the secret key(s) 205 used for the decryption. Therefor, analysis of the result of the decryption enables identification of the receiver who has illicitly disclosed the secret key.

DISCLOSURE OF THE INVENTION

Problems to be Solved by the Invention

A problem of the encryption according to the first conventional technology is that, when a member uses member's own secret key to produce an pirated version of the decryption device, it may be necessary, in order to find whose secret key is used, to directly investigate a circuit or a program code of the device. When the circuit or the program code of the device to be investigated has been obfuscated, it is very difficult to identify the secret key. However, once the secret key is identified, it is easy to produce a ciphertext which cannot be decrypted by this secret key, namely to disable this unauthorized person. This is because it is sufficient to remove the holder of the secret key from the distribution member set of the ciphertexts.

A description will now be given of a problem of the second conventional encryption. Even when a group of any members get together bringing own secret keys, and produce a pirated version of the decryption device, it is easy to identify a secret key of at least one of the members. Moreover, it is only necessary to enter a plurality of ciphertexts, and to observe how they are decrypted without the necessity of direct investigation of the circuit of the device or the program code. However, even when the subject secret key is identified, it is difficult to produce a ciphertext which cannot be decrypted by this secret key, namely to disable the corresponding member.

The above-mentioned two problems are in mutually opposite relationship, and the problem of one encryption is solved in the other encryption. However, a method which solves both of the problems at the same time is not known.

A description will now be given of a reason that a natural combination of the first method according to the first conventional technology and the second method according to the second conventional technology cannot successfully solve both of the problems.

A method in which a ciphertext generator who is given a message encrypts the message according to the first method, and then encrypts the encrypted message according to the second method corresponds to this natural method. When the message is long, and the message is directly encrypted, the amount of computation is enormous, and, thus, in practice, the following method is employed. A random string K1 is encrypted according to the first method. A random string K2 is encrypted according to the second method. K=K1+K2 is set to a secret key of a secret key encryption. Then, this string K is used to encrypt the message. A receiver decrypts K1 using the secret key corresponding to the first method, and decrypts K2 using the secret key corresponding to the second method, thereby generating K from both of them to decrypt the message using K.

According to the above-mentioned method, it is possible to disable unauthorized persons in the following way. A certain unauthorized person A calculates the string K1 by the decryption using a secret key A1 held by the person A according to the first method, and calculates the string K2 by the decryption using a secret key A2 held by the person A according to the second method, resulting in generating a pirated version for obtaining the secret key K. A tracer for unauthorized person wants to obtain this pirated version, and to cause the unauthorized person and the pirated version not to be able to decrypt ciphertexts any longer, namely to disable the unauthorized person.

The tracer for unauthorized person uses the algorithm of black box type for tracing unauthorized person according to the second method to identify the secret key A2 of the person A without directly analyzing a circuit or a program of the pirated version. Then, based on this information, for subsequent ciphertexts, the string K1 is encrypted such that the person A is excluded from intended receivers so that the string K1 cannot be decrypted by the secret key A1 according to the first method. Subsequently, because the pirated version can decrypt the string K2, but cannot decrypt the string K1, thus the pirated version cannot obtain the secret key K.

Though this method of disabling an unauthorized person is effective for the above-mentioned example, this method is not sufficiently effective for the following case. Certain unauthorized persons A and B collude to calculate the string K1 by decryption using the secret key A1 held by the person A according to the first method, and calculates the string K2 by decryption using a secret key B2 held by the person B according to the second method, resulting in generating a pirated version for obtaining the secret key K. The tracer for unauthorized person wants to obtain this pirated version, and to cause the unauthorized persons and the pirated version not to be able to decrypt ciphertexts any longer, namely to disable the unauthorized persons.

The tracer for unauthorized person uses the algorithm of black box type for tracing unauthorized person according to the second method to identify the secret key B2 of the person B without directly analyzing a circuit or a program of the pirated version. Then, based on this information, for subsequent ciphertexts, the string K1 is encrypted such that the person B is excluded from intended receivers so that the string K1 cannot be decrypted by the secret key B1 according to the first method. Of course, when it is possible to ask for submission of the pirated version, and to identify the person B in the real world, the person B can be punished. However, when a large number of the pirated versions have been duplicated and have been widely distributed, those pirated versions can continue to decrypt messages in the following way.

First, the string K1 can be calculated by decryption using the secret key A1 held by the person A according to the first method. This is because, the decryption of the string K1 has been disabled for the secret key B1, but not for the secret key A1. Then, the string K2 is calculated by the decryption using the secret key B2 of the person B according to the second method, and the string K can be consequently obtained. In other words, how many times duplications of the pirated version may be newly found, only the person B is identified again, and the person A cannot be identified for disabling the secret key A1.

In other words, it can be considered that though the tracer for unauthorized person has successfully traced at least one unauthorized person, the tracer for unauthorized person has failed in disabling the pirated versions. This method hardly addresses the case in which a large number of pirated versions are distributed on the Internet, which pauses a problem.

It is an object of this invention to provide a system for disabling an unauthorized person, an encryption device, a decryption device, an unauthorized person disabling device, an encryption method, a decryption method, a method for disabling an unauthorized person, and a program, all of which prevent a program and a device from being illicitly duplicated.

Means for Solving the Problems

In order to attain the above-mentioned object, according to the present invention, a system for disabling an unauthorized person has a structure including:

an encryption device including:
  a storage unit for storing distribution member set data, a random number, and a public key, the distribution member set data being information on members who are registered members and are permitted to decrypt a ciphertext; and
  a control unit for, when at least one of a shared key and a message is input, generating and distributing an error-containing ciphertext which is a ciphertext containing the shared key or the message, the distribution member set data, and error information which is information different for each of the members, and an error-correcting ciphertext which is a ciphertext of the error information; and a decryption device connected to the encryption device, the decryption device including:
  a storage unit for storing the public key and a secret key corresponding to the own device; and
  a control unit for, when the error-containing ciphertext and the error-correcting ciphertext are received from the encryption device, determining whether the own device is included in the distribution member set data, and, when the own device is included in the distribution member set data, decrypting the error-containing ciphertext and the error-correcting ciphertext with the public key and the secret key, removing the error information from the decrypted error-containing ciphertext to output the shared key or the message.

According to this invention, when the own device is not included in the member set data, the ciphertext is not decrypted, and when an unauthorized person is excluded from the member set data, only a decryption device owned by the unauthorized person cannot decrypt the ciphertext.

Meanwhile, in order to attain the above-mentioned object, according to the present invention, an unauthorized person disabling device for identifying a decryption device, which carries out unauthorized processing, of decryption devices owned by registered members has a structure including:

a storage unit for storing information on at least one of a shared key for tracing which is an original shared key and a massage for tracing which is an original message, distribution member set data including information on identification numbers different for each of the decryption devices, a public key, and a threshold serving as a reference for determining the unauthorized person; and a control unit for generating a ciphertext for tracing which, when the unauthorized processing is carried out, cannot output a correct shared key or message with a significant probability, using the public key, transmitting a plurality of the ciphertexts for tracing to the respective decryption devices, calculating, when a plurality of shared keys or messages are received from the decryption devices, probabilities that each of the plurality of received shared keys and the shared key for tracing match or probabilities that each of the plurality of received messages and the message for tracing match, determining whether a difference in the probabilities between the decryption devices having successive identification numbers is smaller than the threshold, and determining that the decryption devices with a probability larger than the threshold is to be disabled.

According to this invention, when a decryption device owned by an unauthorized person decrypts a ciphertext, a probability that a decrypted shared key or message matches original information is extremely different from that of other decryption devices. As a result, it is possible to identify the decryption device owned by the unauthorized person.

Effects of the Invention

This invention can disable only an unauthorized person, who has illicitly duplicated a program or device, to decrypt a ciphertext once the unauthorized person is identified even when the ciphertext is distributed to all members including the unauthorized person. Then, it is possible to prevent the unauthorized person from subsequently illicitly decrypting ciphertexts.

BEST MODE FOR CARRYING OUT THE INVENTION

Notation

First, a description will be given of a notation.

p and q are prime numbers different from each other, and n is a composite number which satisfies n=pq. $G_B$ and $G_T$ are cyclic groups of order n. $G_B'$ is a subgroup of $G_B$ of order q, and $G_T'$ is a subgroup of $G_T$ of the order q. $G''_T$ is a subgroup of $G_T$ of order p. g is one of generators of $G_B$, g' is one of generators of $G_B'$, g" is one of generators of $G_B''$, $g_T$ is one of generators of $G_T$, and $g_T'$ is one of generators of $G_T'$.

On this occasion, $G_B$ is an additive cyclic group, and $G_T$ is a multiplicative cyclic group. $\alpha$ times of $g_1 \in G_B$ is denoted by $[\alpha]g_1$, and $\alpha$th power of $g_t \in G_T$ is denoted by $g_t\alpha$.

e is a non-degenerate bilinear mapping from $G_B$ by $G_B$ to $G_T$. On this occasion, "bilinear" implies that, with respect to all $\alpha$, $\beta \in Z/qZ$ and $g_1$, $g_2 \in G_B$, $e([\alpha]g_1, [\beta]g_2) = e(g_1, g_2)\alpha\beta$ holds. Moreover, "non-degenerate" implies that $e(g, g)$ is a generator of $G_T$.

L is an integer, and $\Lambda$ is a direct product of $\{1, \ldots, L\}$ and $\{1, \ldots, L\}$. In other words, elements of $\Lambda$ are specified as two numbers from 1 to L, for example, (i, j) for i and j. Thus, the number of the elements of $\Lambda$ is $L^2$.

$\Lambda_j \subset \Lambda$ is a subset of $\Lambda$ which can be represented as (i, j) where $\overline{i} \in \{1, \ldots, L\}$. Moreover, the respective elements (i, j) of $\Lambda$ correspond to respective members one by one. Because the number of the elements of $\Lambda$ is $L^2$, though it may appear that the number of members need to be represented as $L^2$, when L is selected so that $L^2$ is larger than the number of members, and unwanted members are considered as conventional, and thus are not used, it is possible to select an arbitrary N. $A\hat{\,}B$ is equivalent to $A^B$.

First Embodiment

Figure 1:
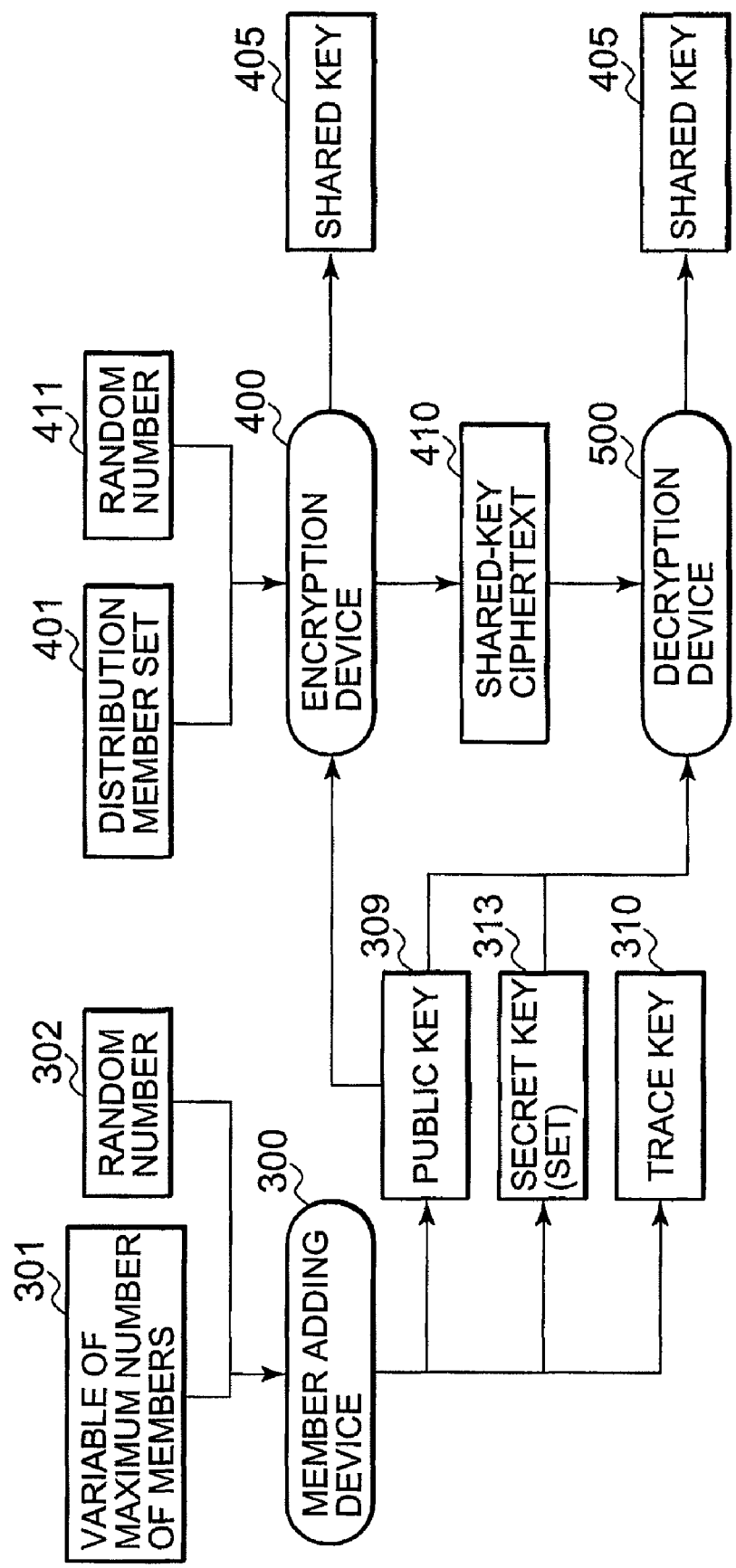
FIG. 1 is a block diagram illustrating an example of a configuration of a system for disabling an unauthorized person according to first, third, and fifth embodiments.

A description will now be given of a configuration of a system for disabling an unauthorized person according to this embodiment. FIG. 1 is a block diagram illustrating an example of the configuration of the system for disabling an unauthorized person according to this embodiment.

As illustrated in FIG. 1, the system for disabling an unauthorized person includes a member adding device 300, an encryption device 400, and a plurality of decryption devices 500. The plurality of decryption devices 500 have the same configuration, and FIG. 1 illustrates only one of the decryption devices. The respective devices are connected with each other via communication lines such as networks. A detailed description will now be given of the respective configurations.

Figure 2:
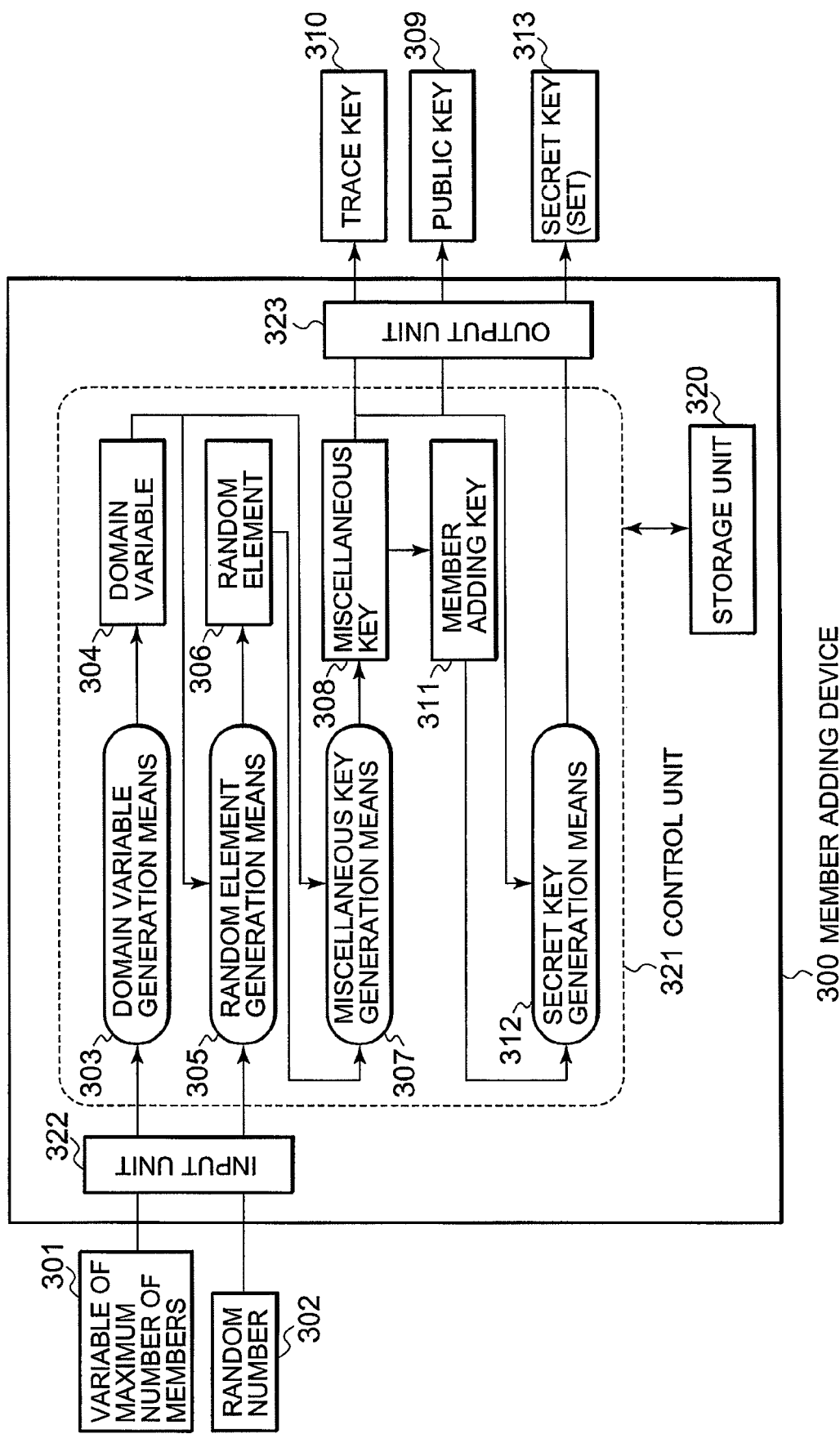
FIG. 2 is a block diagram illustrating an example of a configuration of a member adding device according to first to sixth embodiments.

First, a description will be given of a configuration of the member adding device 300. FIG. 2 is a block diagram illustrating an example of the configuration of the member adding device 300.

As illustrated in FIG. 2, the member adding device 300 includes a storage unit 320, a control unit 321, an input unit 322, and an output unit 323. The input unit 322 and the output unit 323 constitute a communication unit for transmitting/receiving data to/from the outside via networks. The control unit 321 includes a central processing unit (CPU) (not shown) for carrying out predetermined processing according to programs, and a memory (not shown) for storing the programs.

The control unit 321 includes domain variable generation means 303, random element generation means 305, miscellaneous key generation means 307, and secret key generation means 312. The domain variable generation means 303, the random element generation means 305, the miscellaneous key generation means 307, and the secret key generation means 312 are virtually constructed in the member adding device 300 by the CPU carrying out processing according to the programs.

The secret key generation means 312 generates secret keys for respective members belonging to a distribution member set.

In the storage unit 320, domain variables 304, random elements 403, miscellaneous keys 308, and a member adding key 311 which are calculated during processing carried out by the control unit 321 as well as information received from the outside are stored.

A description will now be given of an operation of the member adding device 300.

A variable of maximum number of members L 301 and a random number 302 are input from the outside. L is an integer satisfying $N < L^2 + 1$ where N is the number of the members treated by the system according to this embodiment.

The domain variable generation means 303 determines L, p, q, n, $G_B$, $G_T$, and e. In other words, the domain variable generation means 303 generates the domain variables 304 specifying them. Then, the random element generation means 305 uses the random number 302 and the domain variables 304 to uniformly and randomly generate the following random elements 306:

generators g, h of $G_B$,
generators g', h' of $G_B'$,
generator g" of $G_B"$,
generator $g_T$ of $G_T$, and
generator $g_T'$ of $G_T'$;
and
$\eta \in Z/qZ$,
$\alpha \in Z/nZ$,
$(\beta_j)_{j=1,\ldots,L} \in (Z/nZ)^L$,
$(\delta_j)_{j=1,\ldots,L} \in (Z/nZ)^L$, and
$(\gamma_i)_{j=1,\ldots,L} \in (Z/nZ)^L$.

Then, the miscellaneous key generation means 307 uses the domain variables 304 and the random elements 306 to generate the following miscellaneous keys 308:

$(g_i)_{i=1,\ldots,2L} = ([\alpha^i]g)_{i=1,\ldots,2L}$,
$m' = [\eta]g'$,
$(m_i)_{i=1,\ldots,2L} = ([\eta\alpha^i]g)_{i=1,\ldots,2L}$,
$(g'_i)_{i=1,\ldots,2L} = ([\alpha^i]g')_{i=1,\ldots,2L}$,
$(v'_i)_{i=1,\ldots,2L} = ([\alpha^i\eta]g')_{i=1,\ldots,2L}$,
$(b'_j)_{j=1,\ldots,L} = ([\beta_j\eta]g')_{j=1,\ldots,L}$,
$(d_j)_{j=1,\ldots,L} = ([\delta_j]g)_{j=1,\ldots,L}$,
$(w'_j)_{j=1,\ldots,L} = ([\eta\delta_j]g')_{j=1,\ldots,L}$,
$(y_i)_{i=1,\ldots,L} = ([\gamma_i]g)_{i=1,\ldots,L}$,
$(z'_j)_{j=1,\ldots,L} = ([\eta\beta_j]h')_{j=1,\ldots,L}$,
$m = [\eta]g$,
$(w_j)_{j=1,\ldots,L} = ([\eta\delta_j]g)_{j=1,\ldots,L}$,
$(b_j)_{j=1,\ldots,L} = ([\beta_j\eta]m)_{j=1,\ldots,L}$, and
$(z_j)_{j=1,\ldots,L} = ([\eta\beta_j]H)_{j=1,\ldots,L}$.

Then, the miscellaneous key generation means 307, from data of the random elements 306 and the miscellaneous keys 308, selects and outputs the public key 309, the member adding key 311, and the trace key 310 in the following way.

Public key 309:
PKEY=(L, g, h, m', $(g_i, m_i, g'_i, V'_i)_{i=1,\ldots,L,L+2,\ldots,2L}$, $(y_i)_{i=1,\ldots,L}$, $(b'_j, d_j, w'_j, z'_j)_{j=1,\ldots,L}$)

Member adding key 311: MKEY=($\alpha$, $(\delta_j, \beta_j)_{j=1,\ldots,L}$, $(\gamma_i)_{i=1,\ldots,L}$)

Trace key 310: TKEY=(g', h', g", m, $(w_j, b_j, Z_j)_{j=1,\ldots,L}$)

Moreover, the secret key generation means 312 uses the public key 309 and the member adding key 311 to generate the secret keys 313: SKEY[ij]=$k_{ij}$=$[\delta_j\alpha^i + \beta_j\gamma_i]g$ with respect to all (i, j)$\in \Lambda$, and outputs a set thereof.

Figure 3:
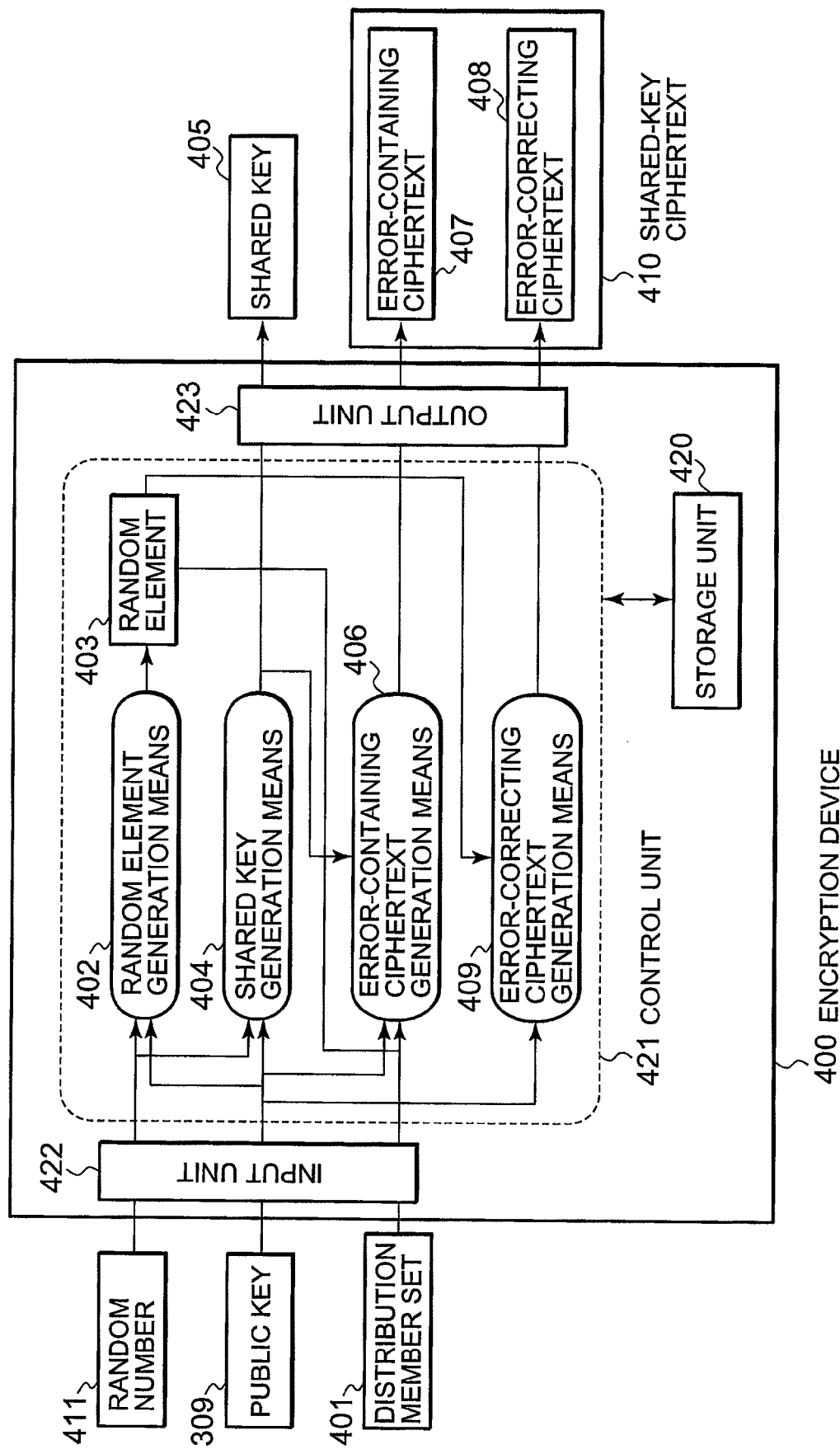
FIG. 3 is a block diagram illustrating an example of a configuration of an encryption device according to the first, third, and fifth embodiments.

A description will now be given of a configuration of the encryption device 400. FIG. 3 is a block diagram illustrating an example of the configuration of the encryption device 400.

As illustrated in FIG. 3, the encryption device 400 includes a storage unit 420, a control unit 421, an input unit 422, and an output unit 423. The input unit 422 and the output unit 423 constitute a communication unit for transmitting/receiving data to/from the outside via networks. The control unit 421 includes a CPU (not shown) for carrying out predetermined processing according to programs, and a memory (not shown) for storing the programs.

The control unit 421 includes random element generation means 402, shared key generation means 404, error-containing ciphertext generation means 406, and error-correcting ciphertext generation means 409. The random element generation means 402, the shared key generation means 404, the error-containing ciphertext generation means 406, and the error-correcting ciphertext generation means 409 are virtually constructed in the encryption device 400 by the CPU carrying out processing according to the programs. In the storage unit 420, random elements 403 calculated in processing carried out by the control unit 421 as well as information received from the outside are stored.

The error-containing ciphertext generation means 406, when at least any one of a shared key and a message, a distribution member set data, which is data representing a set of members for which the decryption of a ciphertext is permitted, and the public key 309 are input, generates an error-containing ciphertext 407, which is a type of a ciphertext including at least any one of the shared key 405 and the message. The distribution member set data includes information on identifiers which are different for each of the members.

The error-containing ciphertext 407 is a ciphertext of data produced by adding error information which is information different for each of the members belonging to the distribution member set to at least any one of the shared key 405 and the message. Then, the error-containing ciphertext 407 is encrypted by a method depending on the member set so that the error-containing ciphertext 407 can be decrypted by the secret keys of the respective members belonging to the distribution member set. Moreover, the error-containing ciphertext 407 includes the distribution member set data.

The error-correcting ciphertext generation means 409, when data including the public key 309 is input, generates an error-correcting ciphertext 408. The error correction ciphertext 410 is a ciphertext for the error information. The decryption devices 500 of the respective members, by decrypting the error correction ciphertext 408 using the respective secret key, can obtain the error information corresponding to the respective members.

According to this embodiment, the detailed description is given of the case in which the shared key is generated, and is encrypted. However, a message may independently be input, and the message may be encrypted in place of the shared key. Moreover, the public key 309 is generated by the member adding device 300.

Figure 4:
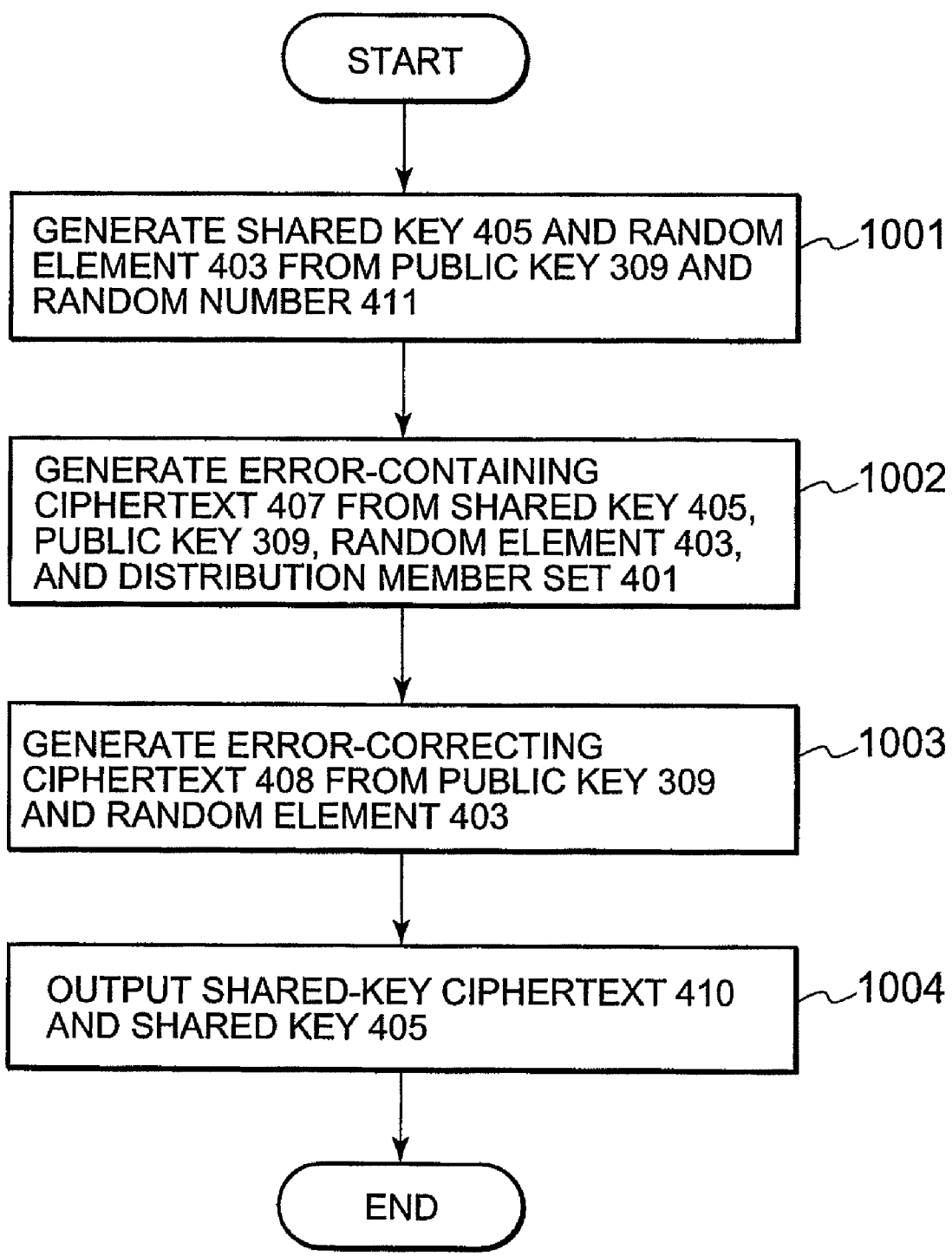
FIG. 4 is a flowchart illustrating operation steps of the encryption device.

A description will now be given of an operation of the encryption device 400. FIG. 4 is a flowchart illustrating operation steps of the encryption device.

When a distribution member set 401, which is data representing a distribution member set $S \subset \Lambda$, and a random number 411 are input from the outside, and the public key 309 is input from the member adding device 300, the shared key generation means 404 uses the public key 309 and the random number 411 to uniformly and randomly generate the shared key 405: $K \in G_T$. Moreover, the random element generation means 402 uses the public key 309 and the random number 411 to uniformly and randomly generate random elements 403 including $(\sigma_j)_{j=1,\ldots,L} \in (Z/nZ)^L$, $(\epsilon_i)_{i=1,\ldots,L} \in (Z/nZ)^L$, and $\tau \in Z/nZ$ (Step 1001).

Then, the error-containing ciphertext generation means 406 uses the shared key 405, the public key 309, the random elements 403, and the distribution member set 401 to generate the error-containing ciphertext 407 (Step 1002). Elements of the error-containing ciphertext 407 includes S and, with respect to all $i=1,\ldots,L$, $C_j = Ke(g'_1, m_L)^{\wedge}\sigma_j\tau)$, $e'_j = [\sigma_j\tau]m'$, $f'_j = [\sigma_j\tau](w'_j + \Sigma_k \in S \cap \Lambda_j v'_{L+1-k})$, and $r'_j = [\sigma_j]b'_j$, $t'_j = [\sigma_j]z'_j$.

Moreover, the error-correcting ciphertext generation means 409 uses the public key 309 and the random elements 403 to generate the error-correcting ciphertext 408 (Step 1003). Elements of the error-correcting ciphertext 408 are, with respect to all $j=1,\ldots,L$, $s_i = [\tau]y_i + [\epsilon_i]h$, and $u_i = [\epsilon_i]g$. It should be noted that any one of the processing in Step 1002 and the processing in Step 1003 may be carried out first.

Then, the control unit 421 outputs a shared-key ciphertext 410: $HDR(S) = (S, (C_j, e'_j, f'_j, r'_j, t'_j)_{j=1,\ldots,L}, (s_i, u_i)_{i=1,\ldots,L})$, which contains the error-containing ciphertext 407 and the error-correcting ciphertext 408. Moreover, the control unit 421 outputs the generated shared key 405 (Step 1004).

Figure 5:
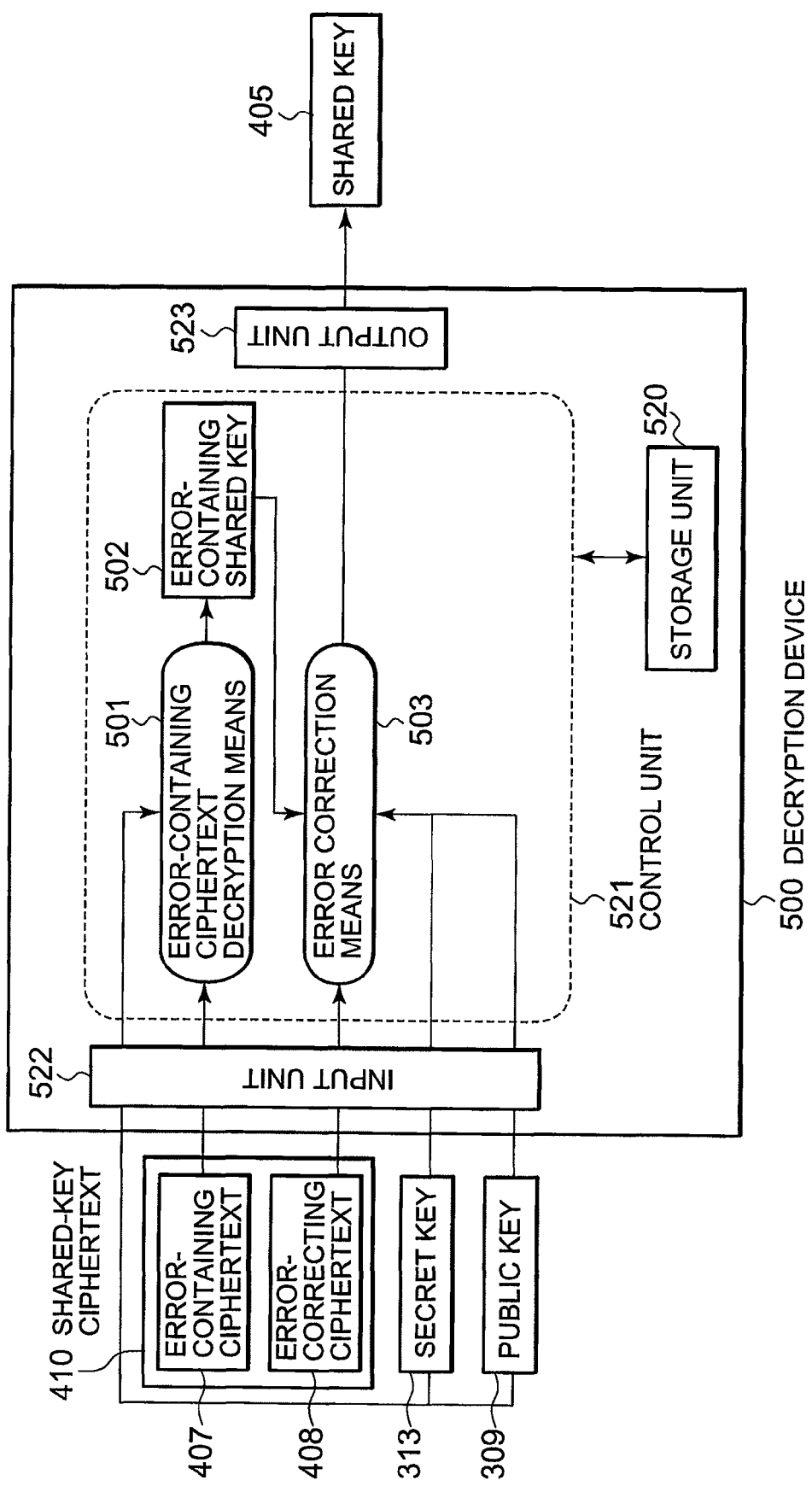
FIG. 5 is a block diagram illustrating an example of a configuration of a decryption device according to the first, third, and fifth embodiments.

A description will now be given of a configuration of the decryption device 500. FIG. 5 is a block diagram illustrating an example of the configuration of the decryption device 500.

As illustrated in FIG. 5, the decryption device 500 includes a storage unit 520, a control unit 521, an input unit 522, and an output unit 523. The input unit 522 and the output unit 523 constitute a communication unit for transmitting/receiving data to/from the outside via networks. The control unit 521 includes a CPU (not shown) for carrying out predetermined processing according to programs, and a memory (not shown) for storing the programs.

The control unit 521 includes error-containing ciphertext decryption means 501 and error correction means 503. The error-containing ciphertext decryption means 501 and the error correction means 503 are virtually constructed in the decryption device 500 by the CPU carrying out processing according to the programs. In the storage unit 520, an error-containing shared key 502 calculated in processing carried out by the control unit 521 as well as information received from the outside are stored. Moreover, an identifier of the own device registered as a member is stored.

The error-containing ciphertext decryption means 501, when the error-containing ciphertext 407, the public key 309, and the secret key 313 are input, outputs at least any one of the error-containing shared key 502 and an error-containing message. The error-containing shared key 502 is a shared key to which the error information different for each of the members belonging to the distribution member set is added. The error-containing message is a message to which the error information is added.

The error correction means 503, when the error-containing shared key 502, the public key 309, the secret key 313, and the error correction ciphertext 408 are input, decrypts the error correction ciphertext 408 using the secret key 313 to extract the error information, and outputs the shared key obtained by removing the error information from the error-containing shared key 502. Moreover, the error correction means 503, when the error-containing message is input, outputs the message obtained by removing the error information from the error-containing message.

Though, according to this embodiment, the description is given of the case in which the data to be decrypted is the shared key, the shared key may be considered as the message. Moreover, the public key 309 and the secret key 313 are generated by the member adding device 300.

Figure 6:
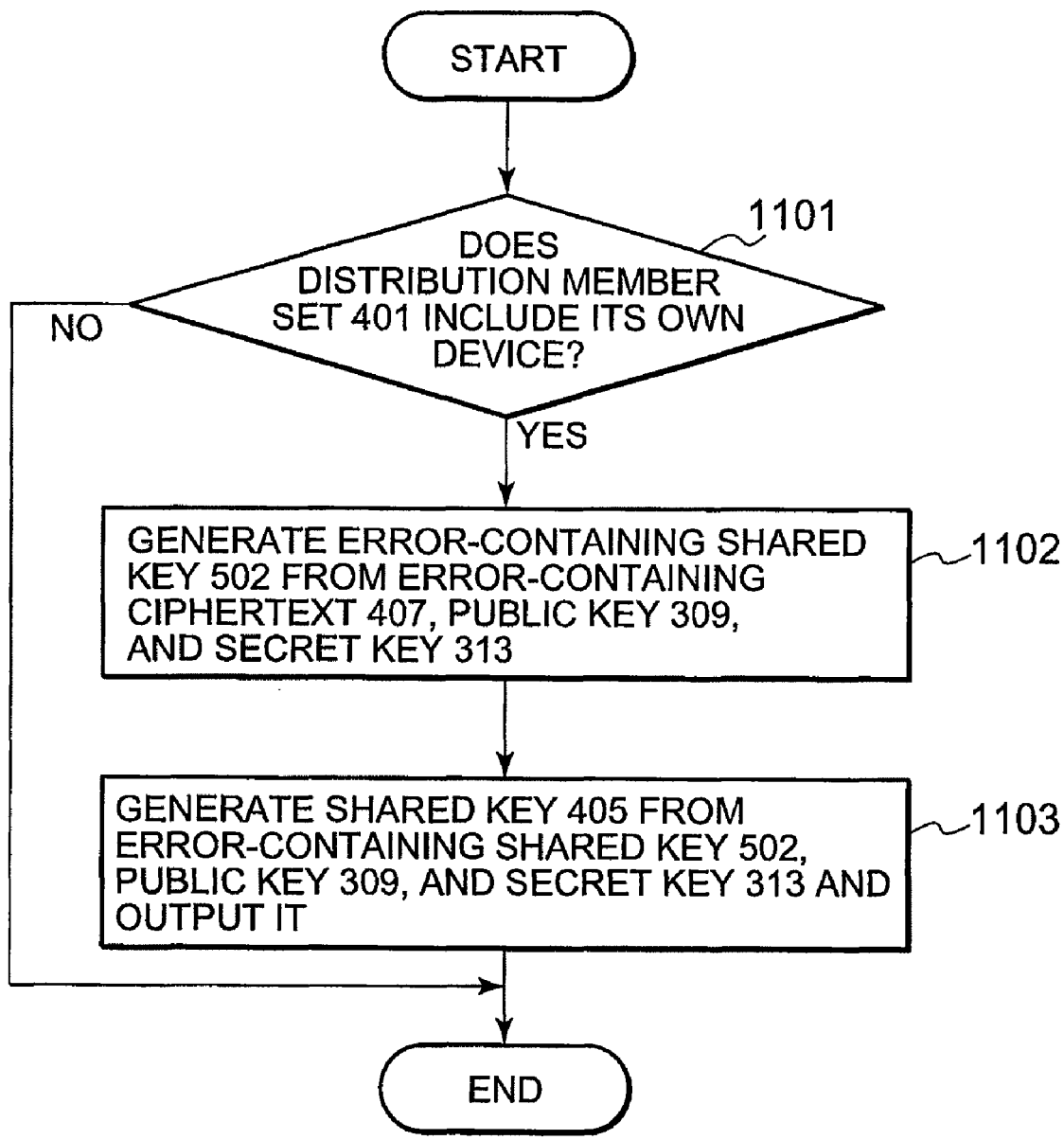
FIG. 6 is a flowchart illustrating operation steps of the decryption device.

A description will now be given of an operation of the decryption device 500. FIG. 6 is a flowchart illustrating operation steps of the decryption device.

The shared-key ciphertext HDR(S) 410 is input from the encryption device 400, and the public key PKEY 309 and the secret key SKEY[ij] 313 are input from the member adding device 300. On this occasion, for an index (i, j), which serves as the identifier of the respective members, $(i, j) \in S$ holds. The error-containing ciphertext decryption means 501 determines whether the distribution member set 401 includes information on the identifier of the own device (Step 1101). When the distribution member set 401 includes the information on the identifier of the own device, the decryption device 500 proceeds to Step 1102, and when the distribution member set 401 does not include the information on the identifier of the own device, the decryption device 500 finishes the processing without decrypting the ciphertext.

In Step 1102, the error-containing ciphertext decryption means 501 uses the error-containing ciphertext 407, the public key 309, and the secret key 313 to generate the error-containing shared key K'502: $K'=C_j(e(e'_j, k_{ij} + \Sigma_{k \neq i,k \in S} \cap \Lambda_j G_{L+1-k+i})/e(g_i, f_j))$.

Then, the error correction means 503 uses the error-containing shared key 502, the public key 309, and the secret key 313 to generate the shared key K 405: $K=K'(e(t'_j, u_i)/e(r'_j, s_i))$. Then, the control unit 521 outputs the shared key K 405 (Step 1103).

Referring to FIG. 1, a description will now be given of the system for disabling an unauthorized person according to this embodiment.

The member adding device 300, when the variable of maximum number of members 301 and the random number 302 are input, generates the public key 309, the trace key 310 and the secret keys 313 for each index $(i, j) \in \Lambda$.

To each index (i, j), one decryption device 500 corresponds, and to the decryption device 500 corresponding to (i, j), the public key 309 and the secret key SKEY[ij] 313 are input.

The encryption device 400 generates, when the distribution member set S 401, which illustrates to which decryption devices 500 the shared key is to be distributed, and the public key 309 are input, the shared-key ciphertext 410 and the shared key 405. Then, the encryption device 400 distributes the shared-key ciphertext 410 via a broadcast channel.

Though, by using the shared key 405 and the shared key encryption system, it is possible to distribute any messages to the distribution member set. However, this processing is not the object of this invention, and thus is not further described.

Each of the decryption devices 500, upon receiving the distributed shared-key ciphertext 410, determines whether the distribution member set S includes the index (i, j) corresponding to the own device. When the distribution member set S includes the index (i, j) of the own device, the decryption device 500 uses the secret key 313 and the public key 309 to obtain the shared key 405 from the shared-key ciphertext 410. On the other hand, when the distribution member set S does not include the index (i, j) of the own device, the decryption device 500 does not decrypt the encrypted shared key.

For example, when an unauthorized person is disclosed among the members, it is possible, by removing the index of the unauthorized person from the distribution member set S, for the encryption device to subsequently generate ciphertexts which can be decrypted only in the distribution member set S from which this unauthorized person has been removed.

The system for disabling an unauthorized person according to this embodiment, as described above, can link a ciphertext according to "the encryption for disabling any member" and a ciphertext according to "the encryption for tracing an unauthorized person according to the black box type algorithm" to each other. This is because those two types of encryption are in the relationship in which, when a ciphertext according to the first encryption is decrypted, the noise depending on a key held by a receiver remains, and the noise is removed only when a ciphertext according to the second encryption is decrypted. In this way, since both of the ciphertexts are associated with each other by the noise, it is possible to trace an unauthorized person by means of the second encryption, and to disable the traced unauthorized person by means of the first encryption.

The encryption device and the decryption device according to this invention may be applied to player devices for playing pay DVD's and CD's as well as transmission devices and reception devices for cable television, satellite broadcast, and general broadcast. Receivers having the features of the decryption device according to this invention are delivered to users who pay a subscription fee. The user who has received the delivered reception device, or a user who has purchased a reception device provided with the features according to this invention use the reception devices to receive and preview programs.

In this context, it is assumed that a user produces a new receiving device based on data contained in the receiver owned by the user, and passes the newly produced receiving device to another person. A specific case in which the user distributes a decryption program via the Internet is considered. According to the first conventional technology, even when the decryption program is found on the Internet, it is not always possible to find the unauthorized person. Moreover, according to the second conventional technology, though it is possible to find the unauthorized person, copies of the decryption program widely distributed on the Internet remain operable, and it is thus not possible to stop the damage. However, according to this invention, as described above, it is possible to disable the widely distributed copies of the program to decrypt subsequently broadcasted programs.

Moreover, when a pirated version of the receiving device is produced, it is possible, without investigating a specific circuit or program of this pirated version, to disable the pirated version by distributing ciphertexts which cannot be decrypted by this pirated version, but can still be decrypted by other receiving devices.

This invention can disable only an unauthorized person who has illicitly duplicated a program or device to decrypt a ciphertext once the unauthorized person is identified even when the ciphertext is distributed to all members including the unauthorized person. It is possible to prevent the unauthorized person from illicitly decrypting ciphertexts thereafter.

Second Embodiment

Figure 7:
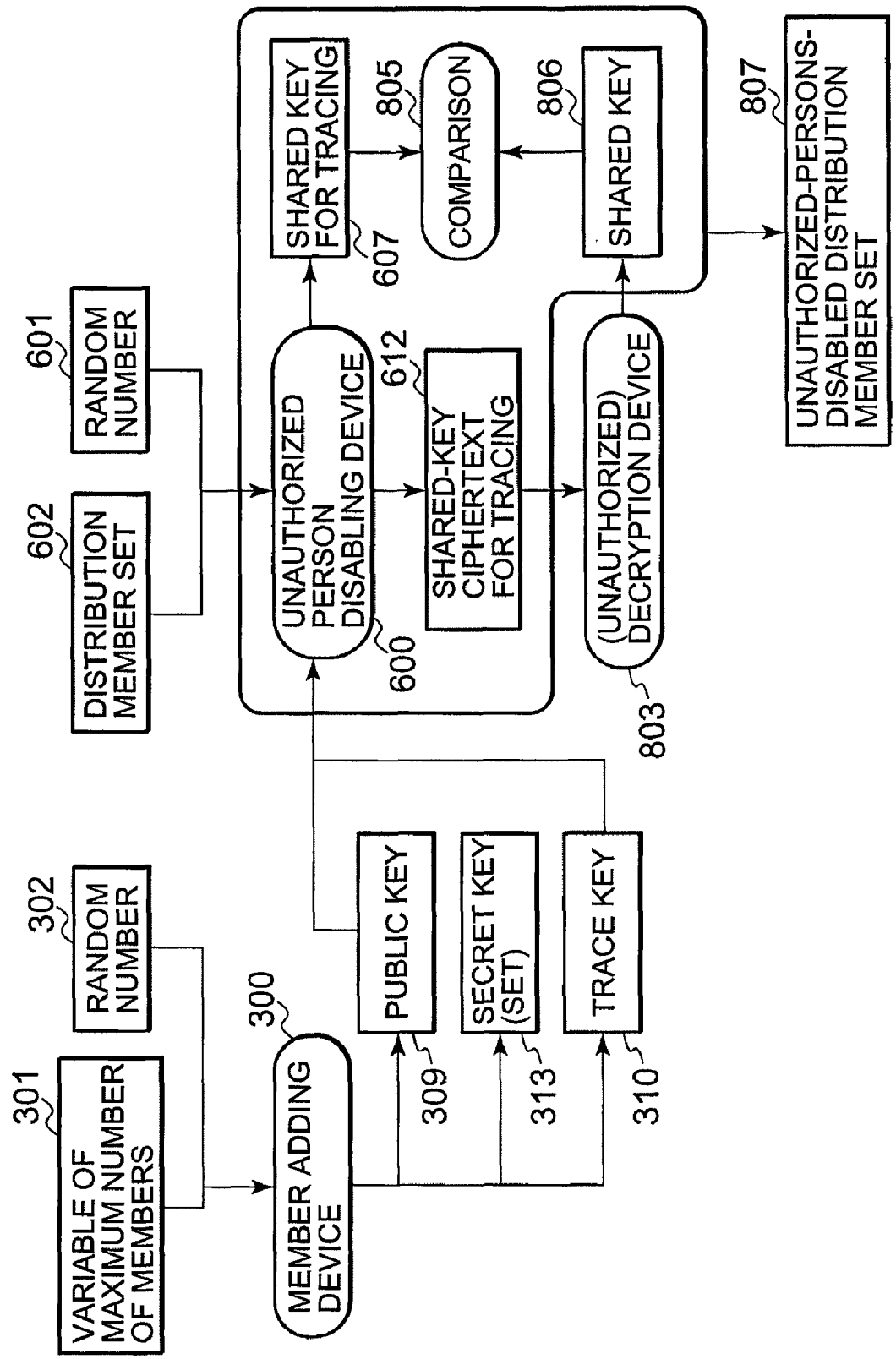
FIG. 7 is a block diagram illustrating an example of a configuration of a system for disabling an unauthorized person according to the second, fourth, and sixth embodiments.

A description will now be given of a configuration of a system for disabling an unauthorized person according to this embodiment. FIG. 7 is a block diagram illustrating an example of the configuration of the system for disabling an unauthorized person according to this embodiment.

As illustrated in FIG. 7, the system for disabling an unauthorized person includes an unauthorized person disabling device 600, the plurality of decryption devices 500, and the member adding device 300. The unauthorized person disabling device 600, the plurality of decryption devices, and the member adding device 300 are connected with each other via communication lines such as networks. FIG. 7 illustrates only one of the decryption devices. The unauthorized person disabling device 600 is connected to the member adding device 300 according to the first embodiment via the communication line. A decryption device 803 is an unauthorized version of the plurality of decryption devices 500 according to the first embodiment.

Figure 8:
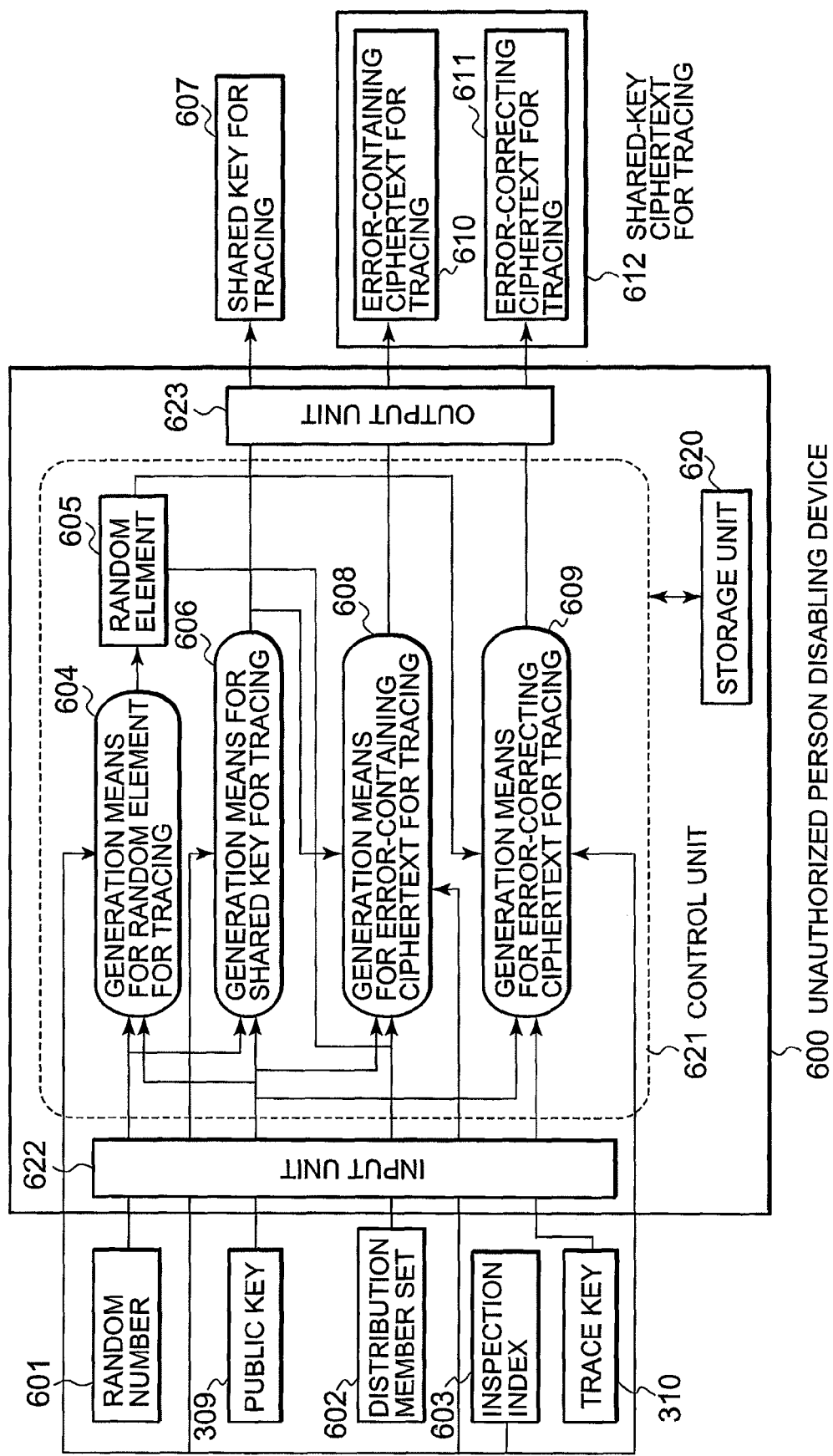
FIG. 8 is a block diagram illustrating an example of a configuration of an unauthorized person disabling device according to the second, fourth, and sixth embodiments.

A description will now be given of a configuration of the unauthorized person disabling device 600. FIG. 8 is a block diagram illustrating an example of the configuration of the unauthorized person disabling device 600.

As illustrated in FIG. 8, the unauthorized person disabling device 600 includes a storage unit 620, a control unit 621, an input unit 622, and an output unit 623. The input unit 622 and the output unit 623 constitute a communication unit for transmitting/receiving data to/from the outside via networks. The control unit 621 includes a CPU (not shown) for carrying out predetermined processing according to programs, and a memory (not shown) for storing the programs.

The control unit 621 includes generation means for random element for tracing 606, generation means for shared key 604, generation means for error-containing ciphertext for tracing 608, and generation means for error-correcting ciphertext for tracing 609. The generation means for random element for tracing 604, the generation means for shared key for tracing 606, the generation means for error-containing ciphertext for tracing 608, and the generation means for error-correcting ciphertext for tracing 609 are virtually constructed in the unauthorized person disabling device 600 by the CPU carrying out processing according to the programs. In the storage unit 620, random elements 605 calculated in processing carried out by the control unit 621 as well as information received from the outside are stored. Moreover, in the storage unit 620, a threshold serving as a reference for determination of an unauthorized person is stored in advance.

The generation means for shared key for tracing 606, when the public key 309 and a random number 601 are input, outputs at least either one of a shared key for tracing 607 and a massage for tracing. The shared key for tracing 607, as an original shared key, is stored in the storage unit 620.

The generation means for error-containing ciphertext for tracing 608, when at least any one of a shared key and a message, a distribution member set data, the inspection indices 603, and the public key 309 are input, generates an error-containing ciphertext 610 for tracing, which is a type of a ciphertext including at least any one of the shared key and the message.

The generation means for error-correcting ciphertext for tracing 609, when data including the inspection index 603, the trace key 310, and the public key 309 are input, generates an error-correcting ciphertext for tracing 611. A ciphertext containing the error-containing ciphertext for tracing 610 and the error-correcting ciphertext for tracing 611 is referred to as shared-key ciphertext for tracing 612.

According to this embodiment, from registered members, members who are destinations of transmission of the shared-key ciphertext for tracing 612 are extracted as a subset, and this subset is designated as a distribution member set 602. The inspection index 603 is an identifier for a member belonging to the distribution member set 602. It should be noted that all the registered members may be included in the distribution member set 602.

The error-containing ciphertext for tracing 610 is a ciphertext of data produced by adding error information which is information different for each of the members belonging to the distribution member set 602 to at least any one of the shared key and the message. The error-containing ciphertext for tracing 610 includes the distribution member set data.

The control unit 621 of the unauthorized person disabling device 600 repeats generation and transmission of a plurality of ciphertexts for tracing to the decryption devices associated with the respective inspection indices 603. Then, the control unit 621 collects information on the shared key from the decryption devices, and calculates probabilities that each of the plurality of received shared keys coincides with the shared key for tracing 607. Then, the control unit 621 determines whether a difference between the probabilities of the decryption devices whose inspection indices 603 are next to each other is smaller than a threshold, and sets a decryption device to be disabled when the decryption device causes the difference larger than the threshold.

A description will now be given of the decryption device according to this embodiment. It should be noted that a configuration of the decryption device is the same as that of the decryption device 500 according to the first embodiment, and, thus, only operations which are different from those according to the first embodiment are described. The unauthorized decryption device 803 cannot output the correct shared key with a significant probability when the shared-key ciphertext for tracing 612 is given. On the other hand, the decryption device 500 which is not unauthorized can output the shared key at the significant probability.

Though, according to this embodiment, the description is given of the case in which the shared key for tracing corresponding to the shared key is generated, the shared key may be considered as the message. Moreover, the public key 309 and the trace key 310 are generated by the member adding device 300.

Figure 9:
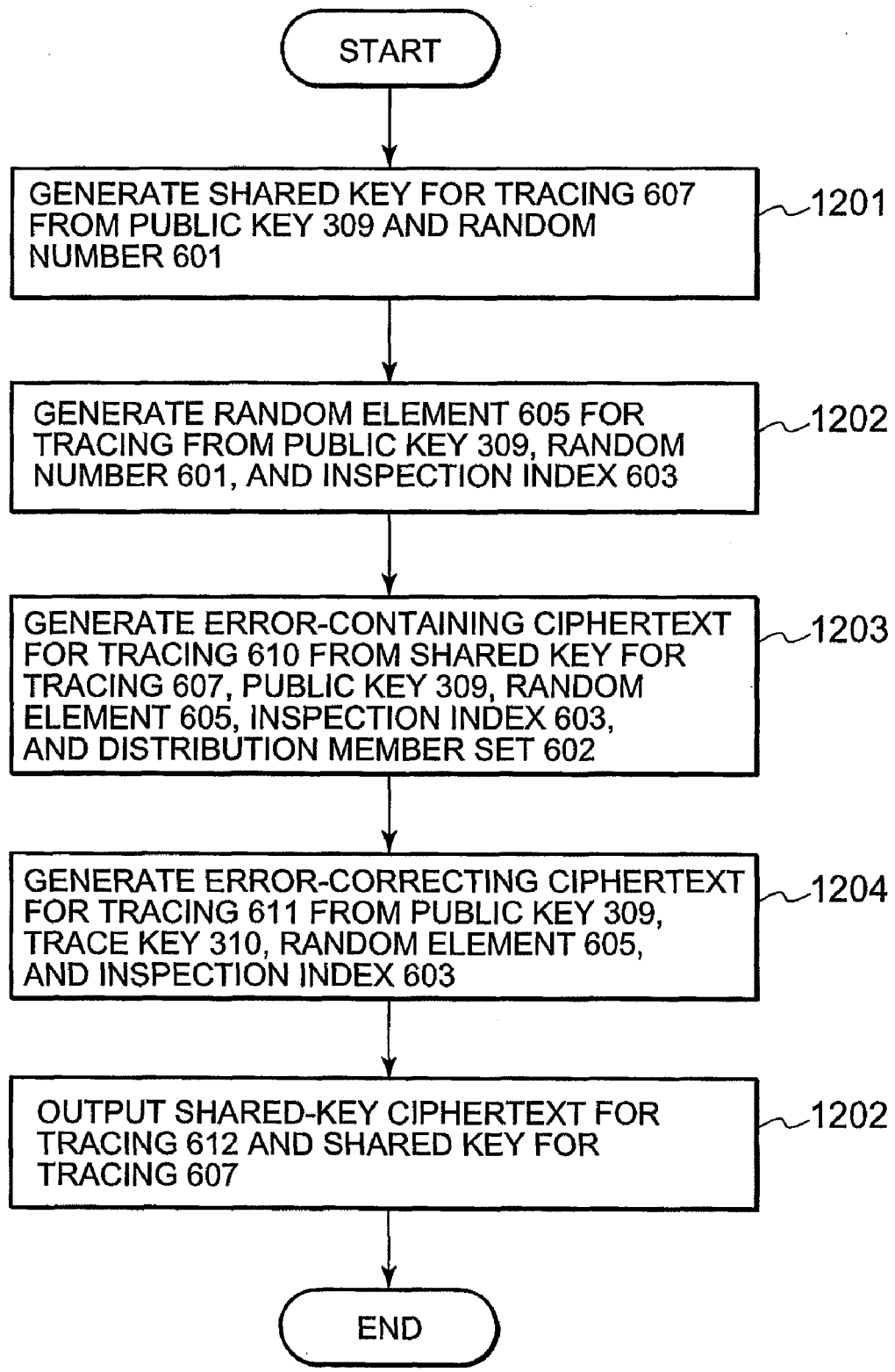
FIG. 9 is a flowchart illustrating operation steps of the unauthorized person disabling device.

A description will now be given of an operation of the unauthorized person disabling device 600. FIG. 9 is a flowchart illustrating operation steps of the unauthorized person disabling device.

The distribution member set $S \subset \Lambda$ 602 including information of the inspection index $(I, J) \in S$ 603 and the random number 601 are input from the outside, and the public key 309 and the trace key 310 are input from the member adding device 300.

The generation means for shared key for tracing 606 uses the public key 309 and the random number 601 to uniformly and randomly generate the shared key for tracing 607: $K \in G_T'$ (Step 1201).

Moreover, the generation means for random elements for tracing 604 uses the public key 309, the random number 601, and the inspection indices 603 to uniformly and randomly generate (Step 1202). The random elements 605 for tracing include $(\sigma_j)_{j=1, \ldots, L} \in (Z/nZ)^L$, $(\sigma'_j)_{j=, \ldots, J-1} \in (Z/nZ)^{J-1}$, $\tau \in Z/nZ$, $(K_j)_{j=1, \ldots, J-1} \in (G_T')^{J-1}$, $(\epsilon_i)_{i=1, \ldots, L} \in (Z/nZ)^L$, and $(\mu_i)_{i=1, \ldots, I} \in (Z/nZ)^I$. It should be noted that either one of the processing in Step 1201 and the processing in Step 1202 may be carried out first.

Then, the generation means for error-containing ciphertext for tracing 609 uses the shared key for tracing 607, the public key 309, the random elements 605, the inspection indices 603, and the distribution member set S 602 to generate the error-containing ciphertext for tracing 610: $(S, C_j, e'_j, f'_j, r'_j, t'_j)_{j=1, \ldots, L}$ in the following way (Step 1203):

for j>J, the generation is carried out as;
$C_j = Ke(g'_1, m_L)^{\{\sigma_j\tau\}}$,
$e'_j = [\sigma_j\tau]m'$,
$f'_j = [\sigma_j\tau](w'_j + \Sigma_{\{k \in S \cap \Lambda_j\}} V'_{L+1-k})$,
$r'_j = [\sigma_j]b'_j$, and
$t'_j = [\sigma_j]z'_j$:

for j=J, the generation is carried out as;
$C_j = Ke(g_1, m_L)^{\{\sigma_j\tau\}}$,
$e'_j = [\sigma_j\tau]m$,
$f'_j = [\sigma_j\tau](w_j + \Sigma_{k \in S \cap \Lambda_j} m_{L+1-k})$,
$r'_j = [\sigma_j]b_j$, and
$t'_j = [\sigma_j]z_j$: and for j<J, the generation is carried out as;
$C_j = K_j e(g_1, m_L)^{\{(\sigma_j\tau)\}}$,
$e'_j = [\sigma_j\tau]m$,
$f'_j = [\sigma_j\tau](w_j + \Sigma_{k \in S \cap \Lambda_j} m_{L+1-k})$,
$r'_j = [\sigma'_j]b_j$, and
$t'_j = [\sigma'_j]z_j$.

Moreover, the generation means for error-containing ciphertext for tracing 609 uses the public key 309, the trace key 310, the random elements 605, and the inspection indices 603 to generate the error-correcting ciphertext for tracing 611: $(s_i, u_i)_{i=1, \ldots, L}$ in the following way (Step 1204):

for i≦I, $s_i = [\tau]y_i + [\epsilon_i]h$, and $u_i = [\epsilon_i]g$ are generated; and for i<I, $s_i = [\tau]y_i + [\epsilon_i]h + [\mu_i]g''$, and $u_i = [\epsilon_i]g$ are generated.

It should be noted that either one of the processing in Step 1203 and the processing in Step 1204 may be carried out first.

Then, the control unit 621 outputs the shared-key ciphertext for tracing 612 containing the error-containing ciphertext for tracing 610 and the error-correcting ciphertext for tracing 611:

HDR[S, I, J]=(S, ($C_j$, $e'_j$, $f_j$, $r'_j$, $t'_j$)$_{j=1,\ldots,L}$, ($s_i$, $u_i$)$_{i=1,\ldots,L}$)

Moreover, the control unit 621 outputs the generated shared key for tracing 607 (Step 1205).

Figure 10:
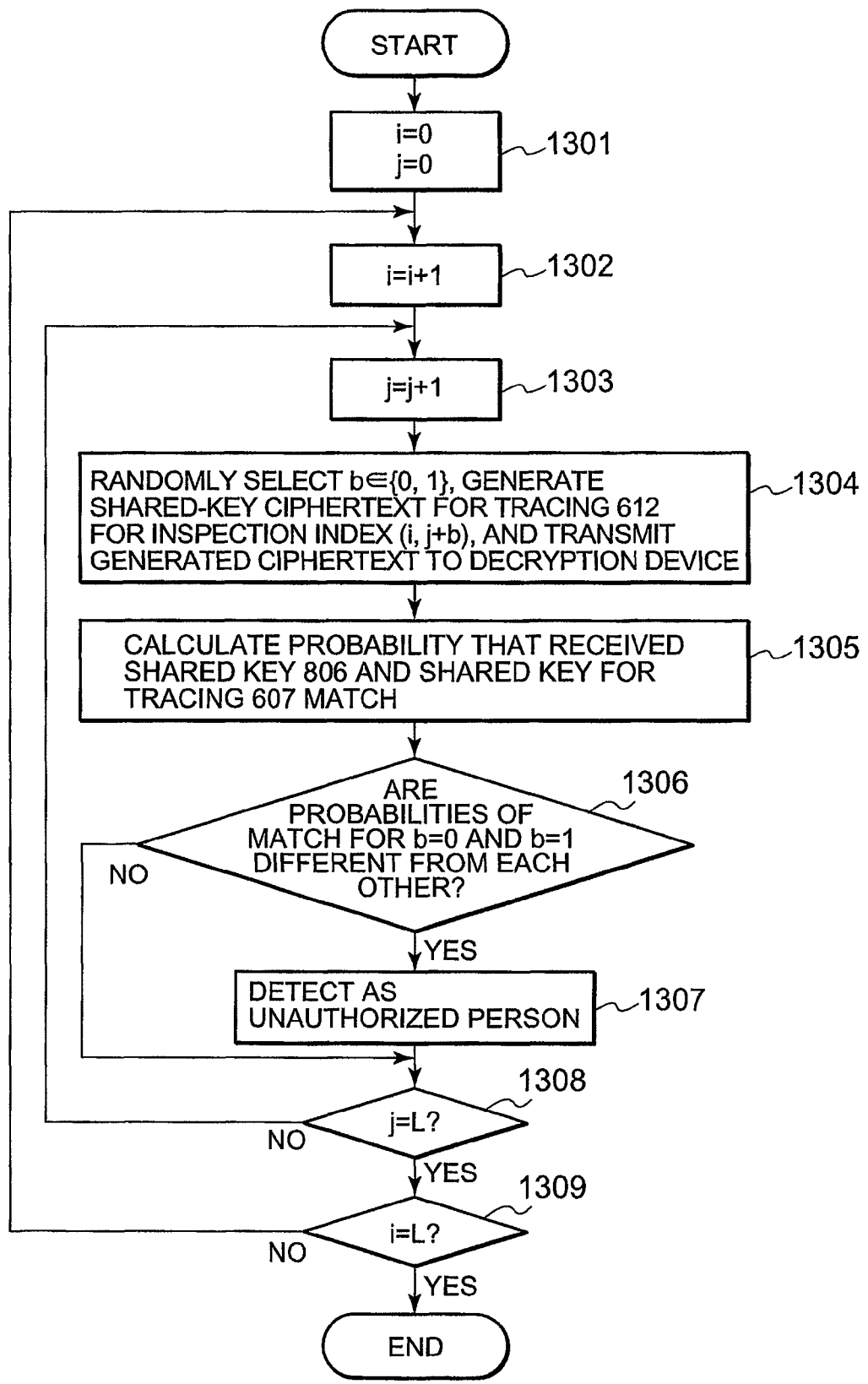
FIG. 10 is a flowchart illustrating operation steps of a search for unauthorized persons carried out by the unauthorized person disabling device.
Figure 11:
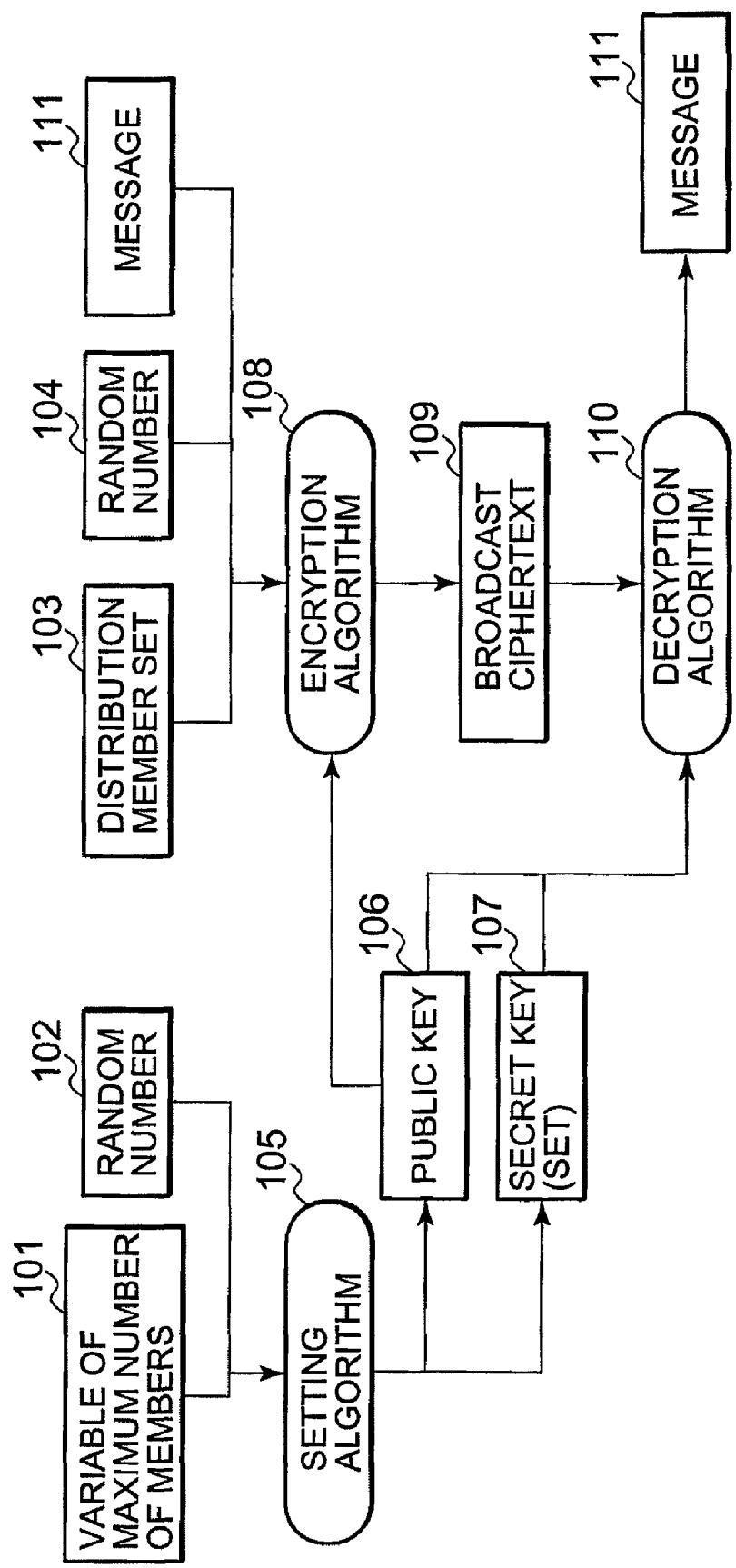
FIG. 11 is a block diagram illustrating an example of a configuration of a conventional broadcast encryption.
Figure 12:
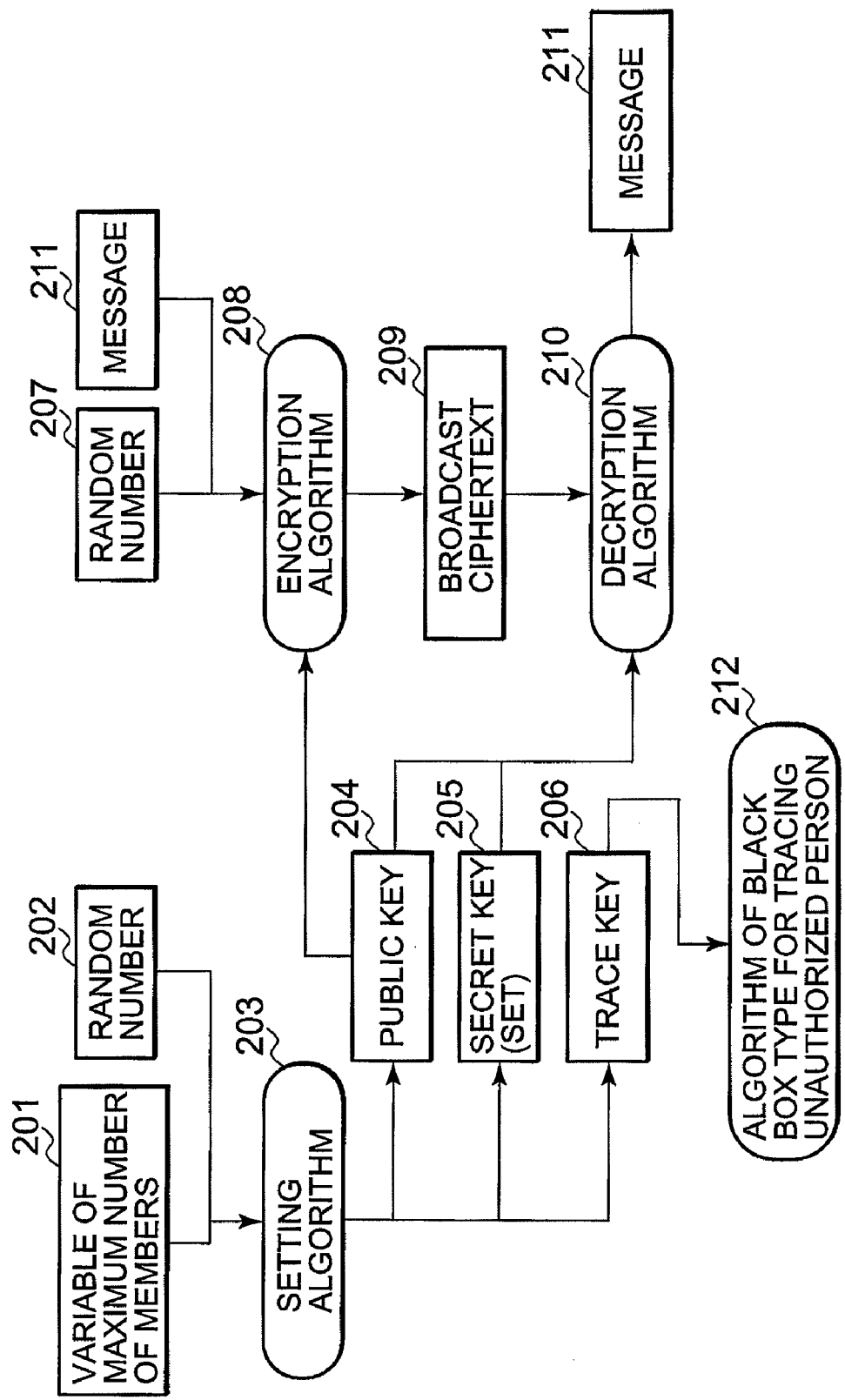
FIG. 12 is a block diagram illustrating another example of the configuration of the conventional broadcast encryption.

A description will now be given of an operation for searching for an unauthorized person carried out by the unauthorized person disabling device 600. FIG. 10 is a flowchart illustrating operation steps of the search for an unauthorized person carried out by the unauthorized person disabling device. For the sake of description, initial values 0 (zero) is set to i and j. FIG. 7 schematically illustrates the processing carried out by the unauthorized person disabling device 600 and the decryption device 803. For this system for disabling an unauthorized person, the distribution member set S* is S.

The unauthorized person disabling device 600 carries out the following operation. To i and j, the initial value is set (Step 1301).

(1) For i=1 to L, the unauthorized person disabling device 600 sequentially carries out processing described in (2) and (3) with respect to i (Steps 1302 and 1309). It should be noted that, in Step 1302, each time i is incremented by one, j is initialized.

(2) For j=1 to L, the unauthorized person disabling device 600 sequentially carries out processing described in (3) with respect to j (Steps 1303 and 1308).

(3) The unauthorized person disabling device 600 repeats processing described in the following (i) and (ii) a large number of times (Step 1304), and obtains the probability that the shared key 806 output by the decryption device 803 matches the shared key for tracing 607 (Step 1305). As a result, when the probability of the match for b=0 and the probability of the match for b=1 are significantly different from each other, the unauthorized person disabling device 600 newly sets a set from which a member corresponding to the inspection index (i, j) is removed from S* to S*, and returns to (1). Subsequently, if the difference between the probabilities of the match is negligible, the unauthorized person disabling device 600 simply finishes (3) (Step 1306). If the probabilities for the inspection index (i, j) and the inspection index (i, j+1) are significantly different from each other, the member corresponding to the inspection index (i, j) is excluded from unauthorized persons, the member corresponding to the inspection index (i, j+1) is considered as an unauthorized person, and the member corresponding to the inspection index (i, j+1) remains in set S* (Step 1307). Whether the difference between the probabilities of the match is negligible or not is determined based on the threshold.

(i) The unauthorized person disabling device 600 randomly selects b∈{0, 1}, and uses S*, (i, j+b), the public key 309, and the trace key 310 to obtain the shared-key ciphertext for tracing 612 and the shared key for tracing 607. When j=L, (i, L+1) is considered as (i+1, 0).

(ii) The unauthorized person disabling device 600 transmits the shared-key ciphertext for tracing 612 to the decryption device 803, and compares an output therefrom with the shared key for tracing 607.

(4) Finally, the unauthorized person disabling device 600 outputs S* which has been changed last. This S* is the member set to be disabled.

In this way, the unauthorized person disabling device 600 obtains the disabled distribution member set S*⊂S 807 which is the set of the decryption devices 803 which are to be disabled for the decryption of the shared-key ciphertext.

In the system for disabling an unauthorized person according to this embodiment, the unauthorized person disabling device outputs a ciphertext from which a decryption device, which has carried out unauthorized processing, cannot output a correct shared key with a significant probability. When the decryption device owned by an unauthorized person decrypts a ciphertext, a probability that a decrypted shared key or message matches original information is extremely different from the probability for other decryption devices. As a result, it is possible to detect the decryption device owned by the unauthorized person. As a result, this embodiment provides the same effect as the first embodiment.

Third Embodiment

A description will be given of a notation used in this embodiment.

p and q are prime numbers different from each other, and n is a composite number which satisfies n=pq. $G_B$ and $G_T$ are cyclic groups of order n. $G_B{'}$ is a subgroup of $G_B$ of order q, and $G_T{'}$ is a subgroup of $G_T$ of order q. $G''_B$ is a subgroup of $G_B$ of order p. G'' is one of generators of $G_B{''}$. On this occasion, $G_B$ is an additive cyclic group, and $G_T$ is a multiplicative cyclic group. α times of G'∈$G_B$ is denoted by [α]G', and αth power of g∈$G_T$ is denoted by gα.

e is a non-degenerate bilinear mapping from $G_B$ by $G_B$ to $G_T$. On this occasion, "bilinear" implies that for all α, β∈Z/qZ and G, H∈$G_B$, e([α]G, [β]H)=e(G, H)αβ holds. Moreover, non-degenerate implies that, when G is a generator of $G_B$, e(G, G) is a generator of $G_T$.

L is an integer, and Λ is a direct product of two sets of {1, ..., L} and {1, ..., L}. In other words, elements of Λ are specified as two numbers from 1 to L, for example, (i, j) with i and j. Thus, the number of the elements of Λ is $L^2$.

$Λ_j$⊂Λ is a subset of Λ which can be represented as (i, j) where i∈{1, ..., L}. Moreover, the respective elements (i, j) of Λ correspond to respective members one by one. Since the number of the elements of Λ is $L^2$, though it may appear that the number of members need to be represented as $L^2$, when L is selected so that $L^2$ is larger than the number of members, and unwanted members are considered as conventional, and thus are not used, it is possible to select an arbitrary N. A^B is equivalent to $A^B$.

For a subset S of Λ: S⊂Λ, S* is represented as Λ\S, namely, represents a complementary set of S.

A description will now be given of the system for disabling an unauthorized person according to this embodiment. The system for disabling an unauthorized person according to this embodiment is the same as the configuration illustrated in FIG. 1, referring to FIGS. 1 to 6, a description will be principally given of configurations and operations different from those of the first embodiment.

As illustrated in FIG. 1, the system for disabling an unauthorized person according to this embodiment includes the member adding device 300, the encryption device 400, and the plurality of decryption devices 500. The plurality of decryption devices 500 have the same configuration, and FIG. 1 illustrates only one of the decryption devices. The respective devices are connected with each other via communication lines such as networks. Since the configurations of the respective devices are the same as those of the first embodiment, a detailed description thereof is omitted.

A description will now be given of an operation of the member adding device 300.

A variable of maximum number of members L 301 and a random number 302 are input from the outside. L is an integer satisfying $N<L^2+1$ where N is the number of the members treated by the system according to this embodiment.

The domain variable generation means 303 determines L, p, q, n, $G_B$, $G_T$, and e. In other words, the domain variable generation means 303 generates the domain variables 304 specifying them. The members are specified as a pair of two integers from one to L.

Then, the random element generation means 305 uses the random number 302 and the domain variables 304 to uniformly and randomly generate the following random elements 306:

generators G, H, M of $G_B$,
generators G', H' of $G_B'$,
generator G" of $G_B"$;
and
$\xi \in Z/nZ$,
$\alpha \in Z/nZ$,
$(\beta_j)_{j=1,\ldots,L} \in (Z/nZ)^L$,
$(\delta_j)_{j=1,\ldots,L} \in (Z/nZ)^L$,
$(\gamma_i)_{i=1,\ldots,L} \in (Z/nZ)^L$, and
$(\theta_k)_{k=1,\ldots,L} \in (Z/nZ)^L$.

Then, the miscellaneous key generation means 307 uses the domain variables 304 and the random elements 306 to generate the following miscellaneous keys 308:

$H=[\xi]G$,
$H'=[\xi]G'$,
$m=e(G, M)$,
$m'=e(G', M)$,
$(B_j)_{j=1,\ldots,L}=([B_j]G)_{j=1,\ldots,L}$,
$(H_j)_{j=1,\ldots,L}=([B_j]H)_{j=1,\ldots,L}$,
$(B'_j)_{j=1,\ldots,L}=([B_j]G')_{j=1,\ldots,L}$,
$(H'_j)_{j=1,\ldots,L}=([B_j]H')_{j=1,\ldots,L}$,
$(G_i)_{i=1,\ldots,2L}=([\alpha^i]G)_{i=1,\ldots,2L}$,
$(G'_i)_{i=1,\ldots,2L}=([\alpha^i]G')_{i=1,\ldots,2L}$,
$(D_j)_{j=1,\ldots,L}=([\delta_j]G)_{j=1,\ldots,L}$,
$(D'_j)_{j=1,\ldots,L}=([\delta_j]G')_{j=1,\ldots,L}$,
$(J_i)_{i=1,\ldots,L}=([\gamma_i]G)_{i=1,\ldots,L}$, and
$(X_{k,i})_{k=1,\ldots,L;i=1,\ldots,2L}=([\theta_k\alpha^i]G)_{i=1,\ldots,2L}$.

A remarkable feature of this embodiment is that the miscellaneous keys 308 include a key $X_{k,i}$ which is proportional to a product of $\theta_k$ randomly generated for every k, and $\alpha^i$ which is i-th power of a constant $\alpha$.

Then, the miscellaneous key generation means 307, from data of the random elements 306 and the miscellaneous keys 308, selects and outputs the public key 309, the member adding key 311, and the trace key 310 in the following way.

Public key 309:
PKEY=(L, n, m, m', G, H, G', $(B_j, H_j, B'_j, H'_j)_{j=1,\ldots,L}$, $(G_i, G'_i)_{i=1,\ldots,L,L+2,\ldots,2L}$, $(D_i, D'_i)_{i=1,\ldots,L}$, $(J_i)_{i=1,\ldots,L}$, $(X_{k,i})_{k=1,\ldots,L,i=1,\ldots,2L}$)

Member adding key 311: MKEY=(M, $\alpha$, $(\delta_j, \beta_j)_{j=1,\ldots,L}$, $(\gamma_i)_{i=1,\ldots,L}$, $(\theta_k)_{k=1,\ldots,L}$)

Trace key 310: TKEY=G"

Moreover, the secret key generation means 312 uses the public key 309 and the member adding key 311 to generate the secret keys 313: SKEY[ij]=$k_{i,j}$=$[\delta_j\alpha^i\theta_i+\beta_j\gamma_i]G+M$, and outputs a set thereof.

A remarkable feature of this embodiment is that, in order to generate this secret key, a process for generating $\alpha^i\theta_i$ which is proportional to the product of $\theta_k$ randomly generated for every k, and the constant $\alpha^i$ is included.

Referring to FIG. 4, a description will now be given of an operation of the encryption device 400. According to this embodiment, the detailed description is given of the case in which the shared key is generated, and is encrypted, but a message may independently be input, and the message may be encrypted in place of the shared key. Moreover, the public key and the secret key are generated by the member adding device 300 according to this embodiment.

The distribution member set 401, which represents the distribution member set $S \subset \Lambda$, and the random number 411 are input from the outside, and the public key 309 is input from the member adding device 300. The shared key generation means 404 uses the public key 309 and the random number 411 to uniformly and randomly generate the shared key 405: $K \in G_T$. Moreover, the random element generation means 402 uses the public key 309 and the random number 411 to uniformly and randomly generate the random elements 403 including $(\sigma_j)_{j=1,\ldots,L} \in (Z/nZ)^L$, $(\epsilon_i)_{i=1,\ldots,L} \in (Z/nZ)^L$, and $\tau \in Z/nZ$ (Step 1001).

Then, the error-containing ciphertext generation means 406 uses the shared key 405, the public key 309, the random elements 403, and the distribution member set 401 to generate the error-containing ciphertext 407 (Step 1002). Elements of the error-containing ciphertext 407 are related to S and all i=1, ..., L:

$c_j = km'^{(\sigma_j\tau)}$,
$E'_j = [\sigma_j\tau]G'$,
$F'_j = [\sigma_j\tau](D'_{j+\Sigma k \in s(j)} G'_{L+1-k})$,
$R'_j = [\sigma_j]B'_j$, and
$T'_j = [\sigma_j]H'_j$.

It should be noted that $S(j)=S^* \cap \Lambda_j$.

Moreover, the error-correcting ciphertext generation means 409 uses the public key 309 and the random elements 403 to generate the error-correcting ciphertext 408 (Step 1003). Elements of the error-correcting ciphertext 408 are $S_i=[\tau]J_i+[\epsilon_i]H$, and $U_i=[\epsilon_i]G$, for all j=1, ..., L. It should be noted that either one of the processing in Step 1002 and the processing in Step 1003 may be carried out first.

According to this embodiment, on this occasion, S(i) used for the encryption does not includes the elements of S. Therefore, when a ciphertext is generated, in order to obtain a sum of $G_{L+1-k}$ with respect to (k, j) belonging to S(j) for all j's, the process is carried out by obtaining a sum of data for the number of members who do not belong to the distribution member set.

Then, the control unit 421 outputs a shared-key ciphertext 410: HDR(S)=(S, $(c_j, E'_j, F'_j, R'_j, T'_j)_{j=1,\ldots,L}$, $(S_i, U_i)_{i=1,\ldots,L}$) which contains the error-containing ciphertext 407 and the error-correcting ciphertext 408. Moreover, the control unit 421 outputs the generated shared key 405 (Step 1004).

Referring to FIG. 6, a description will now be given of an operation of the decryption device 500. Though, according to this embodiment, the detailed description is given of the case in which the data is the shared key, the shared key may be considered as the message. Moreover, the public key and the secret key are generated by the member adding device 300 according to this embodiment.

The shared-key ciphertext HDR(S) 410 is input from the encryption device 400, the public key PKEY 309 and the secret key SKEY[i, j] 313 are input from the member adding device 300. On this occasion, for an index (i, j), which serves as the identifier of the respective members, (i, j)∈S holds.

The error-containing ciphertext decryption means 501 determines whether the distribution member set 401 includes information on the identifier of the own device (Step 1101). When the distribution member set 401 includes the information on the identifier of the own device, the decryption device 500 proceeds to Step 1102, and when the distribution member set 401 does not include the information on the identifier of the own device, the decryption device 500 finishes the processing without decrypting the ciphertext.

In Step 1102, the error-containing ciphertext decryption means 501 uses the error-containing ciphertext 407, the public key 309, and the secret key 313 to generate the error-containing shared key K'502: $k'=c_j(e(X_{i,\,j},\,F'_j)/e(E'_j,\,K_{i,\,j}+\Sigma_k\in_{s(j)}X_{i,\,L+1-k+i}))$. It should be noted that $S(j)=S^*\cap\Lambda_j$.

On this occasion, what is characteristic is that $X_{k,\,i}$ used for the decryption for the respective (i, j) is limited to k=i. Moreover, when this error-containing ciphertext is decrypted, a sum of $X_{i,\,L+1-k}$ is obtained with respect to (k, j) belonging to S(j) for all j's, and thus the process is carried out by obtaining a sum of data for the number of members who do not belong to the distribution member set.

Then, the error correction means 503 uses the error-containing shared key 502, the public key 309, and the secret key 313 to generate the shared key K'405: $k=k'(e(R'_j,\,S_i)/e(T'_j,\,U_i))$. Then, the control unit 521 outputs the shared key k 405 (Step 1103).

The operation of the system for disabling an unauthorized person according to this embodiment, as described above, includes the processing in which the encryption device 400 and the decryption device 500 obtain the sum of the data the number of which is the number of the members who do not belong to the distribution member set, and the other processing is the same as that according to the first embodiment. Thus, a detailed description thereof is omitted.

In the system for disabling an unauthorized person according to this embodiment, it can be proved that, compared with the method according to the first embodiment, even when a larger number of members collude to constitute a pirated version of a decryption device, all the members in collusion can be identified. Actually, this embodiment provides an effect that, even if all the members collude in the piracy, it is possible to identify all of them, and to disable them.

Fourth Embodiment

A description will now be given of the system for disabling an unauthorized person according to this embodiment. The system for disabling an unauthorized person according to this embodiment is the same as the configuration illustrated in FIG. 7. Hence, referring to FIGS. 7 to 10, a description will be principally given of configurations and operations different from those of the second embodiment. Moreover, a notation used for this embodiment is the same as that for the third embodiment, and a detailed description thereof, therefore, is omitted.

As illustrated in FIG. 7, the system for disabling an unauthorized person includes the unauthorized person disabling device 600, the plurality of decryption devices, and the member adding device 300. The unauthorized person disabling device 600, the plurality of decryption devices, and the member adding device 300 are connected with each other via communication lines such as networks. FIG. 7 illustrates only one of the decryption devices. The unauthorized person disabling device 600 is connected to the member adding device 300 according to the third embodiment via the communication line. The decryption device 803 is an unauthorized version of the plurality of decryption devices 500 according to the third embodiment. Since the configurations of the respective devices are the same as those of the second embodiment, a detailed description thereof is omitted.

Referring to FIG. 9, a description will now be given of an operation of the unauthorized person disabling device 600. It should be noted that the public key, the secret key, and the trace key are generated by the member adding device 300 according to the third embodiment.

The distribution member set $S\subset\Lambda$ 602, the inspection index (I, J)∈S 603, and the random number 601 are input from the outside, and the public key 309 is input from the member adding device 300.

The generation means for shared key for tracing 606 uses the public key 309 and the random number 601 to uniformly and randomly generate the shared key for tracing 607: $k\in G_T'$ (Step 1201).

Moreover, the generation means for random elements for tracing 604 uses the public key 309, the random number 601, and the inspection indices 603 to uniformly and randomly generate the random elements 605 for tracing (Step 1202). The random elements 605 for tracing include $(\sigma_j)_{j=1,\,\ldots,\,L}\in(Z/nZ)^L$, $\tau\in Z/nZ$, $(k'_j)_{j=1,\,\ldots,\,J-1}\in(G_T')^{J-1}$, $(\sigma'_j)_{j=1,\,\ldots,\,J-1}\in(Z/nZ)^{J-1}$, $(\epsilon_i)_{i=1,\,\ldots,\,L}\in(Z/nZ)^L$, and $(\epsilon'_i)_{i=1,\,\ldots,\,I}\in(Z/nZ)^L$. It should be noted that any one of the processing in Step 1201 and the processing in Step 1202 may be carried out first.

Then, the generation means for error-containing ciphertext for tracing 608 uses the shared key for tracing 607, the public key 309, the random elements 605, the inspection indices 603, and the distribution member set S 602 to generate the error-containing ciphertext for tracing 610: $(S,\,c_j,\,E'_j,\,F'_j,\,R'j,\,T'_j)_{j=1,\,\ldots,\,L}$ in the following way (Step 1203):

for j>J, the generation is carried out as;
$c_j=km'\hat{}\{\sigma_j\tau\}$,
$E'_j=[\sigma_j\tau]G'$,
$F'_j=[\sigma_j\tau](D'_j+\Sigma_k\in_{s(j)}G'_{L+1-k})$,
$R'_j=[\sigma_j]B'_j$, and
$T'_j=[\sigma_j]H'_j$:

for j=J, the generation is carried out as;
$c_j=km\hat{}\{\sigma_j\tau\}$,
$E'_j=[\sigma_j\tau]G$,
$F'_j=[\sigma_j\tau](D_j+\Sigma_k\in_{s(j)}G_{L+1-k})$,
$R'_j=[\sigma_j]B_j$, and
$T'_j=[\sigma_j]H_j$:

for j<J, the generation is carried out as;
$c_j=k'_jm\hat{}\{\sigma_j\tau\}$,
$E'_j=[\sigma_j\tau]G$,
$F'_j=[\sigma_j\tau](D_j+\Sigma_k\in_{s(j)}G_{L+1-k})$,
$R'_j=[\sigma_j]B_j$, and
$T'_j=[\sigma_j]H_j$.

According to this embodiment, individually, S(i) used for the encryption does not include the elements of S. Therefore, when a ciphertext is generated, for all j's, for (k, j) belonging to S(j), a sum for $G_{L+1-k}$ is obtained, and thus the process is carried out by obtaining a sum of data for the number of members who do not belong to the distribution member set.

Moreover, the generation means for error-correcting ciphertext for tracing 609 uses the public key 309, the trace key 310, the random elements 605, and the inspection indices 603 to generate the error-correcting ciphertext for tracing 611: $(Ss_i,\,U_i)_{i=1,\,\ldots,\,L}$ in the following way (Step 1204):

for i≧I, $S_i=[\tau]J_i+[\epsilon_i]H$, and $U_i=[\epsilon_i]G$ are generated; and for i<I, $S_i=[\tau]J_i+[\epsilon_i]H+[\epsilon'_i]G''$, and $U_i=[\epsilon_i]G$ are generated. It should be noted that any one of the processing in Step 1203 and the processing in Step 1204 may be carried out first.

Then the control unit 621 outputs the shared-key ciphertext for tracing 612 containing the error-containing ciphertext for tracing 610 and the error-correcting ciphertext for tracing 611:

$HDR[S,\,I,\,J]=(S,\,(c_j,\,E'_j,\,F'_j,\,R'_j,\,T'_j)_{j=1,\,\ldots,\,L},\,(S_i,\,U_i)_{i=1,\,\ldots,\,L})$ Moreover, the control unit 621 outputs the generated shared key for tracing 607 (Step 1205).

The operation of the system for disabling an unauthorized person according to this embodiment is, as described above, that the unauthorized person disabling device 600 obtains the sum of the data for the number of members who do not belong to the distribution member set. Since the other operations such as the operation for searching for an unauthorized person described referring to FIG. 10 are the same as those of the second embodiment, a detailed description thereof is omitted.

In the system for disabling an unauthorized person according to this embodiment, it can be proved that, compared with the method according to the second embodiment, even when a larger number of members collude to constitute a pirated version of a decryption device, all the members in collusion can be identified. Actually, this embodiment provides an effect that, even if all the members collude in the piracy, it is possible to identify all of them, and to disable them.

Fifth Embodiment

A notation used for this embodiment is the same as the notation described in the third embodiment, and a description thereof, therefore, is omitted.

A description will now be given of the system for disabling an unauthorized person according to this embodiment. Since the configuration of the system for disabling an unauthorized person according to this embodiment except that the member adding device 300 does not generate the trace key 310 is the same as that illustrated in FIG. 1, a detailed description of the configurations of the respective devices is omitted. Referring to FIGS. 1 to 6, a description will be principally given of operations different from those of the third embodiment.

As illustrated in FIG. 1, the system for disabling an unauthorized person according to this embodiment includes the member adding device 300, the encryption device 400, and the plurality of decryption devices 500. The plurality of decryption devices 500 each have the same configuration, and FIG. 1 illustrates only one of the decryption devices. The respective devices are connected with each other via communication lines such as networks. The member adding device 300 according to this embodiment does not generate the trace key 310 illustrated in FIG. 1, which is different from the third embodiment.

A description will now be given of an operation of the member adding device 300.

The variable of the maximum number of members L 301 and the random number 302 are input from the outside. L is an integer satisfying $N<L^2+1$ where N is the number of members treated by the system according to this embodiment.

The domain variable generation means 303 determines L, p, q, n, $G_B$, $G_T$, and e. In other words, the domain variable generation means 303 generates the domain variables 304 specifying them. The members are specified by a pair of two integers out of 1 to L.

Then, the random element generation means 305 uses the random number 302 and the domain variables 304 to uniformly and randomly generate the following random elements 306:

generators G, H, M of $G_B$;
generators G', H'' of $G_B$';
generator G'' of $G_B$'';
and
$\xi \in Z/nZ$,
$\alpha \in Z/nZ$,
$(\beta_j)_{j=1,\ldots,L} \in (Z/nZ)^L$,
$(\delta_j)_{j=1,\ldots,L} \in (Z/nZ)^L$,
$(\gamma_i)_{i=1,\ldots,L} \in (Z/nZ)^L$,
$(\theta_k)_{k=1,\ldots,L} \in (Z/nZ)^L$, and
$(\lambda, \pi) \in (Z/nZ)^2$.

In this embodiment, $(\lambda, \pi)$ is included in the random elements 306.

Then, the miscellaneous key generation means 307 uses the domain variables 304 and the random elements 306 to generate the miscellaneous keys 308:

$H=[\xi]G$,
$H'=[\xi]G'$,
$m=e(G, M)$
$m'=e(G', M)$
$(B_j)_{j=1,\ldots,L}=([B_j]G)_{j=1,\ldots,L}$,
$(H_j)_{j=1,\ldots,L}=([B_j]H)_{j=1,\ldots,L}$,
$(B'_j)_{j=1,\ldots,L}=([B_j]G')_{j=1,\ldots,L}$,
$(H'_j)_{j=1,\ldots,L}=([B_j]H')_{j=1,\ldots,L}$,
$(G_i)_{i=1,\ldots,2L}=([\alpha^i]G)_{i=1,\ldots,2L}$,
$(G'_i)_{i=1,\ldots,2L}=([\alpha^i]G')_{i=1,\ldots,2L}$,
$(D_j)_{j=1,\ldots,L}=([\delta_j]G)_{j=1,\ldots,L}$,
$(D'_j)_{j=1,\ldots,L}=([\delta_j]G')_{j=1,\ldots,L}$,
$(J_i)_{j=1,\ldots,L}=([\gamma_i]G)_{i=1,\ldots,L}$,
$(X_{k,i})_{k=1,\ldots,L; i=1,\ldots,2L}=([\theta_k \alpha^i]G)_{i=1,\ldots,2L}$, and
$(V, W)=([\pi]G, [\lambda]G''+[\pi]H)$.

The miscellaneous keys 308 include (V, W), which is different from the third embodiment.

A remarkable feature of this embodiment is, as in the third embodiment, that the miscellaneous keys 308 include the key $X_{k,i}$ which is proportional to the product of $\theta_k$ randomly generated for every k, and $\alpha^i$ which is i-th power of the constant $\alpha$.

Then, the miscellaneous key generation means 307, from the data of the random elements 306 and the miscellaneous keys 308, selects and outputs the public key 309, the member adding key 311, and the trace key 310 in the following way.

Public key 309:
PKEY={L, n, m, m', G, H, G', $(B_j, H_j, B'_j, H'_j)_{j=1,\ldots,L}$, $(G_i, G'_i)_{i=1,\ldots,L, L+2,\ldots,2L}$, $(D_i, (D'_i)_{i=1,\ldots,L}$, $(J_i)_{i=1,\ldots,L}$, $(X_{k,i})_{k=1,\ldots,L, i=1,\ldots,2L}$, (V, W)}

Member adding key 311: MKEY=(M, $\alpha$, $(\delta_j, \beta_j)_{j=1,\ldots,L}$, $(\gamma_i)_{i=1,\ldots,L}$, $(\theta_k)_{k=1,\ldots,L}$)

Moreover, the secret key generation means 312 uses the public key 309 and the member adding key 311 to generate the secret keys 313: SKEY[ij]=$k_{i,j}$=$[\delta_j \alpha^i \theta_i + \beta_j \gamma_i]G+M$ for all $(i,j) \in \Lambda$, and outputs a set thereof.

A remarkable feature of this embodiment is, as in the third embodiment, that, in order to generate the secret key, the process for generating the value $\alpha^i \theta_i$ which is proportional to the product of $\theta_k$ randomly generated for every k, and the constant $\alpha^i$ is included. Moreover, compared with the third embodiment, it is not necessary to generate the trace key.

Referring to FIG. 4, a description will now be given of an operation of the encryption device 400. According to this embodiment, the detailed description is given of the case in which the shared key is generated, and is encrypted, a message may independently be input, and the message may be encrypted in place of the shared key. Moreover, the public key and the secret key are generated by the member adding device 300 according to this embodiment.

The distribution member set 401, which is the data representing the distribution member set $S \subset \Lambda$, and the random number 411 are input from the outside, and the public key 309 is input from the member adding device 300. The shared key generation means 404 uses the public key 309 and the random number 411 to uniformly and randomly generate the shared key 405: $K \in G_T$. Moreover, the random element generation means 402 uses the public key 309 and the random number 411 to uniformly and randomly generate the random elements 403 including $(\sigma_j)_{j=1,\ldots,L} \in (Z/nZ)^L$, $(\epsilon_i)_{i=1,\ldots,L} \in (Z/nZ)^L$, and $(\tau, p) \in (Z/nZ)^2$ (Step 1001). In the encryption device 400 according to this embodiment, in correspondence with the fact that the member adding device 300 does not generate the trace key, the random elements 403 include $(\tau, p)$. The error-containing ciphertext 407, the error-correcting ciphertext 408, and the like, which will be described later, include "p", which is different from the third embodiment.

Then, the error-containing ciphertext generation means 406 uses the shared key 405, the public key 309, the random elements 403, and the distribution member set 401 to generate the error-containing ciphertext 407 (Step 1002). Elements of the error-containing ciphertext 407 include S and, for all i=1, ..., L:

$c_j = km^{r} (\sigma_j T)$,
$E'_j = [\sigma_j T] G'$,
$F'_j = [\sigma_j T](D'j + \Sigma_k \in_{s(j)} G'_{L+1-k})$,
$R'_j = [\sigma_j] B'_j$, and
$T'_j = [\rho \sigma_j] H'_j$.

It should be noted that $S(j) = S^* \cap \Lambda_j$.

Moreover, the error-correcting ciphertext generation means 409 uses the public key 309 and the random elements 403 to generate the error-correcting ciphertext 408 (Step 1003). Elements of the error-correcting ciphertext 408 are, for all j=1, ..., L, $S_i = [\tau] J_i + [\rho \epsilon_i] H$, and $U_i = [\epsilon_i] G$. It should be noted that any one of the processing in Step 1002 and the processing in Step 1003 may be carried out first.

According to this embodiment, individually, S(i) used for the encryption does not include the elements of S. Therefore, when a ciphertext is generated, for all j's, for (k, j) belonging to S(j), a sum for $G_{L+1-k}$ is obtained, and thus the process is carried out by obtaining a sum of data for the number of members who do not belong to the distribution member set.

Then, the control unit 421 outputs the shared-key ciphertext 410 containing the error-containing ciphertext 407 and the error-correcting ciphertext 408:

$HDR(S) = (S, (c_j, E'_j, F'_j, R'_j, T'_j)_{j=1, ..., L}, (S_i, U_i)_{i=1, ..., L})$

Moreover, the control unit 421 outputs the generated shared key 405 (Step 1004).

Though the encryption device 400 does not directly use the trace key, the encryption device 400, in correspondence with the processing carried out by the member adding device and the unauthorized person disabling device which will be described in a sixth embodiment, as described above, carries out the processing different from that according to the third embodiment.

Referring to FIG. 6, a description will now be given of an operation of the decryption device 500. Though, according to this embodiment, the detailed description is given of the case in which the data is the shared key, the shared key may be considered as the message. Moreover, the public key and the secret key are generated by the member adding device 300 according to this embodiment.

The shared-key ciphertext HDR(S) 410 is input from the encryption device 400, the public key PKEY 309 and the secret key SKEY[ij] 313 are input from the member adding device 300. On this occasion, for an index (i, j), which serves as the identifier of the respective members, $(i, j) \in S$ holds.

The error-containing ciphertext decryption means 501 determines whether the distribution member set 401 includes information on the identifier of the own device (Step 1101). When the distribution member set 401 includes the information on the identifier of the own device, the decryption device 500 proceeds to Step 1102, and when the distribution member set 401 does not include the information on the identifier of the own device, the decryption device 500 finishes the processing without decrypting the ciphertext.

In Step 1102, the error-containing ciphertext decryption means 501 uses the error-containing ciphertext 407, the public key 309, and the secret key 313 to generate the error-containing shared key K' 502: $k' = c_j(e(X_{i,i}, F'_j)/e(E'_j, K_{i,j} + \Sigma_k \in_{s(j)} X_{i,L+1-k+i}))$. It should be noted that $S(j) = S^* \cap \Lambda_j$.

On this occasion, what is characteristic is that $X_{k,i}$ used for the decryption for the respective (i, j) is limited to k=i. Moreover, when this error-containing ciphertext is decrypted, for all j's, for (k, j) belonging to S(j), a sum for $X_{i,L+1-k}$ is obtained, and thus the process is carried out by obtaining a sum of data for the number of members who do not belong to the distribution member set.

Then, the error correction means 503 uses the error-containing shared key 502, the public key 309, and the secret key 313 to generate the shared key K' 405: $k = k'(e(R'_j, S_i)/e(T'_j, U_i))$. Then, the control unit 521 outputs the shared key k 405 (Step 1103).

The operation of the system for disabling an unauthorized person according to this embodiment, as described above, includes the processing in which the encryption device 400 and the decryption device 500 obtain the sum of data for the number of members who do not belong to the distribution member set, and the other processing is the same as that according to the first embodiment, and thus is not further described in detail.

Though the processing carried out by the decryption device 500 according to this embodiment appears to be the same as the processing according to the third embodiment, the public key 309 received from the member adding device 300 and the shared-key ciphertext 410 received from the encryption device 400 include the components different from those according to the third embodiment.

In the system for disabling an unauthorized person according to this embodiment, it can also be proved that, as in the third embodiment, even when a larger number of members collude to constitute a pirated version of a decryption device, all the members in collusion can be identified. Actually, this embodiment provides an effect that, even if all the members collude in the piracy, it is possible to identify all of them, and to disable them.

Sixth Embodiment

A description will now be given of the system for disabling an unauthorized person according to this embodiment.

Since the configuration of the system for disabling an unauthorized person according to this embodiment except that the member adding device 300 does not generate the trace key 310 is the same as that illustrated in FIG. 7, a detailed description of the configurations of the respective devices is omitted. Referring to FIGS. 7 to 10, a description will be principally given of operations different from those of the fourth embodiment.

Moreover, a notation used for this embodiment is the same as that for the third embodiment, and a detailed description thereof, therefore, is omitted.

As illustrated in FIG. 7, the system for disabling an unauthorized person includes the unauthorized person disabling device 600, the plurality of decryption devices, and the member adding device 300. The unauthorized person disabling device 600, the plurality of decryption devices, and the member adding device 300 are connected with each other via communication lines such as networks. FIG. 7 illustrates only one of the decryption devices. The unauthorized person disabling device 600 is connected to the member adding device 300 described in the fifth embodiment via the communication line. The decryption device 803 is an unauthorized version of the plurality of decryption devices 500 described in the fifth embodiment.

Referring to FIG. 9, a description will now be given of an operation of the unauthorized person disabling device 600. It should be noted that the public key and the secret key are generated by the member adding device 300 described in the fifth embodiment.

The distribution member set $S \subset \Lambda$ 602, the inspection index $(I, J) \in S$ 603, and the random number 601 are input from the outside, and the public key 309 is input from the member adding device 300.

The generation means for shared key for tracing 606 uses the public key 309 and the random number 601 to uniformly and randomly generate the shared key for tracing 607: $k \in G_T'$ (Step 1201).

Moreover, the generation means for random elements for tracing 604 uses the public key 309, the random number 601, and the inspection indices 603 to uniformly and randomly generate random elements 605 for tracing (Step 1202). The random elements 605 for tracing include $(\sigma_j)_{j=1,\ldots,L} \in (Z/nZ)^L$, $(\tau, \rho) \in (Z/nZ)^2$, $(k'_j)_{j=1,\ldots,J-1} \in (G_T')^{J-1}$, $(\sigma'_j)_{j=1,\ldots,J-1} \in (Z/nZ)^{J-1}$, $(\epsilon_i)_{i=1,\ldots,L} \in (Z/nZ)^L$, and $(\epsilon'_i)_{i=1,\ldots,I} \in (Z/nZ)^I$. It should be noted that any one of the processing in Step 1201 and the processing in Step 1202 may be carried out first.

Then, the generation means for error-containing ciphertext for tracing 608 uses the shared key for tracing 607, the public key 309, the random elements 605, the inspection indices 603, and the distribution member set S 602 to generate the error-containing ciphertext for tracing 610: $(S, c_j, E'_j, F'_j, R'_j, T'_j)_{j=1,\ldots,L}$ in the following way (Step 1203):

for j>J, the generation is carried out as;
$c_j = km'^{\hat{}} \{\sigma_j T\}$,
$E'_j = [\sigma_j T] G'$,
$F'_j = [\sigma_j T](D'_j + \Sigma_k \in_{s(j)} G'_{L+1-k})$,
$R'_j = [\sigma_j] B'_j$, and
$T'_j = [\rho \sigma_j] H'_j$:

for j=J, the generation is carried out as;
$c_j = km^{\hat{}} \{\sigma_j T\}$,
$E'_j = [\sigma_j T] G$,
$F'_j = [\sigma_j T](D_j + \Sigma_k \in_{s(j)} G_{L+1-k})$,
$R'_j = [\sigma_j] B_j$, and
$T'_j = [\rho \sigma_j] H_j$:

for j<J, the generation is carried out as;
$c_j = k'_j m^{\hat{}} \{\sigma_j T\}$,
$E'_j = [\sigma_j T] G$,
$F'_j = [\sigma_j T](D_j + \Sigma_k \in_{s(j)} G_{L+1-k})$,
$R'_j = [\sigma'_j] B_j$, and
$T'_j = [\rho \sigma'_j] H_j$.

According to this embodiment, individually, S(i) used for the encryption does not include the elements of S. Therefore, when a ciphertext is generated, for all j's, for (k, j) belonging to S(j), a sum for $G_{L+1-k}$ is obtained, and thus the process is carried out by obtaining a sum of data for the number of members who do not belong to the distribution member set.

Moreover, the generation means for error-correcting ciphertext for tracing 609 uses the public key 309, the random elements 605, and the inspection indices 603 to generate the error-correcting ciphertext for tracing 611: $(Ss_i, U_i)_{i=1,\ldots,L}$ in the following way (Step 1204):

for $i \geq I$, $S_i = [\tau]J_i + [\rho \epsilon_i]H$, and $U_i = [\epsilon_i]G$ are generated; and
for i<I, $S_i = [\tau]J_i + [\rho \epsilon_i]H + [\rho \epsilon'_i]W$, and $U_i = [\epsilon_i]G + [\rho \epsilon'_i]V$ are generated. It should be noted that any one of the processing in Step 1203 and the processing in Step 1204 may be carried out first. In Step 1204 of FIG. 9, according to this embodiment, the trace key is not used for generating the error-correcting ciphertext for tracing 611.

Then, the control unit 621 outputs the shared-key ciphertext for tracing 612 containing the error-containing ciphertext for tracing 610 and the error-correcting ciphertext for tracing 611:

HDR[S, I, J] = $(S, (c_j, E'_j, F'_j, R'_j, T'_j)_{j=1,\ldots,L}, (S_i, U_i)_{i=1,\ldots,L})$ Moreover, the control unit 621 outputs the generated shared key for tracing 607 (Step 1205).

The operation of the system for disabling an unauthorized person according to this embodiment is, as described above, that the unauthorized person disabling device 600 obtains the sum of the data for the number of members who do not belong to the distribution member set. Since the other operations such as the operation for searching for an unauthorized person described referring to FIG. 10 are the same as those of the second embodiment, a detailed description thereof is omitted.

In the system for disabling an unauthorized person according to this embodiment, it can also be proved that, without the trace key, as in the fourth embodiment, even when a larger number of members collude to constitute a pirated version of a decryption device, all the members in collusion can be identified. Actually, this embodiment provides an effect that, even if all the members collude in the piracy, it is possible to identify all of them, and to disable them.

It should be noted that the encryption method, decryption method, and method for disabling an unauthorized person according to this invention may be applied to a program to be executed by a computer.

The invention claimed is:

1. A system to disable an encryption/decryption device operated by an unauthorized person, comprising:
an encryption device comprising:
a storage device which stores distribution member set data, a random number, and a public key, the distribution member set data being information on members who are registered members and are permitted to decrypt a ciphertext, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver; and
a processing device which, when at least one of a shared key and a message is input, generates an error-containing ciphertext which is a ciphertext containing the shared key or the message, the distribution member set data, and error information which is information different for each of the members, and an error-correcting ciphertext which is a ciphertext of the error information, obtains, when the error-containing ciphertext is being generated, a sum of data for a number of members who do not belong to the distribution member set, and distributes the error-containing ciphertext and the error-correcting ciphertext; and
a decryption device connected to the encryption device, the decryption device comprising:
a storage device which stores the public key and a secret key corresponding to the decryption device; and
a processing device which, when the error-containing ciphertext and the error-correcting ciphertext are received from the encryption device, determines whether the decryption device is included in the distribution member set data, and, when the decryption device is included in the distribution member set data, decrypts the error-containing ciphertext and the error-correcting ciphertext with the public key and the secret key, obtains, when the error-containing ciphertext is decrypted, the sum of the data for the number of members who do not belong to the distribution member set, and removes the error information from the decrypted error-containing ciphertext to output the shared key or the message.

2. An encryption device for distributing a ciphertext to a decryption device owned by a registered member, comprising:

a storage device which stores distribution member set data, a random number, and a public key, the distribution member set data being information on members who are the registered members and are permitted to decrypt the ciphertext, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver; and a processing device which carries out the processing of generating, when at least one of a shared key and a message is input, an error-containing ciphertext which is a ciphertext containing the shared key or the message, the distribution member set data, and error information which is information different for each of the members, and an error-correcting ciphertext which is a ciphertext of the error information, and obtaining, when the error-containing ciphertext is generated, a sum of data for a number of members who do not belong to the distribution member set.

3. A decryption device for decrypting a ciphertext received from an outside, comprising:

a storage device which stores a public key and a secret key corresponding to the decryption device, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer between 1 to L, L is an arbitrary integer, $\alpha^i$ is the i-th power of a constant integer $\alpha$ (i is any integer from 1 to 2L), and each of combinations (k, i) corresponds to a different receiver; and a processing device which determines, when an error-containing ciphertext which is a ciphertext containing information on at least one of a shared key and a message, error information which is information different for each of a plurality of registered decryption devices and corresponds to the decryption device, and distribution member set data which is information on members who are permitted to decrypt the ciphertext, and an error-correcting ciphertext which is a ciphertext of the error information are input, whether the decryption device is included in the distribution member set data, decrypts, when the decryption device is included in the distribution member set data, the error-containing ciphertext and the error-correcting ciphertext with the public key and the secret key, obtains, when the error-containing ciphertext is decrypted, a sum of data for a number of members who do not belong to the distribution member set, and removes the error information from the decrypted error-containing ciphertext to output the shared key or the message.

4. An unauthorized person disabling device for identifying a decryption device, which carries out unauthorized processing, of decryption devices owned by registered members, comprising:

a storage device which stores information on at least one of a shared key for tracing which is an original shared key and a massage for tracing which is an original message, distribution member set data containing information on identification numbers different for each of the decryption devices, a public key, and a threshold serving as a reference for determining an unauthorized person, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any of integer from 1 to 2L), and each of combinations (k, i) corresponds to a different receiver; and a processing device which carries out the processing of generating a ciphertext for tracing which, when the unauthorized processing is carried out, cannot output a correct shared key or message with a significant probability, using the public key, transmitting a plurality of the ciphertexts for tracing to the respective decryption devices, calculating, when a plurality of shared keys and messages are received from the decryption devices, probabilities that each of the plurality of received shared keys and the shared key for tracing match and probabilities that each of the plurality of received message and the message for tracing match, determining whether a difference in the probabilities between the decryption devices having successive identification numbers is smaller than the threshold, and determining that the decryption devices with a probability larger than the threshold is to be disabled, and obtaining, when the ciphertext for tracing is generated, a sum of data for a number of members who do not belong to the distribution member set.

5. An unauthorized person disabling device according to claim 4, wherein:

the storage device stores a trace key; and
the processing device generates the ciphertext for tracing using the public key and the trace key.

6. An encryption method using an encryption device for distributing a ciphertext to a decryption device owned by a registered member, comprising:

storing, when distribution member set data, a random number, and a public key are input, the input information in a storage unit, the distribution member set data being information on members who are the registered members and are permitted to decrypt the ciphertext, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver; and generating, when at least either one of a shared key and a message is input, an error-containing ciphertext which is a ciphertext containing the shared key or the message, the distribution member set data, and error information which is information different for each of the members, and an error-correcting ciphertext which is a ciphertext of the error information, and obtaining, when the error-containing ciphertext is generated, a sum of data for a number of members who do not belong to the distribution member set.

7. A decryption method using a decryption device for decrypting a ciphertext received from an outside, comprising:
storing, when a public key and a secret key corresponding to the decryption device are input, the input information in a storage unit, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver;
determining, when an error-containing ciphertext containing information on at least one of a shared key and a message, error information which is information different for each of a plurality of registered decryption devices and corresponds to the decryption device, and distribution member set data which is information on members who are permitted to decrypt the ciphertext, and an error-correcting ciphertext which is a ciphertext of the error information are input, whether the decryption device is included in the distribution member set data;
decrypting, when the decryption device is included in the distribution member set data, the error-containing ciphertext and the error-correcting ciphertext with the public key and the secret key;
obtaining, when the error-containing ciphertext is decrypted, a sum of data for a number of members who do not belong to the distribution member set; and
removing the error information from the decrypted error-containing ciphertext to output the shared key or the message.

8. A method of disabling an unauthorized person using an unauthorized person disabling device for identifying a decryption device, which carries out unauthorized processing, of decryption devices owned by registered members, comprising:
storing, in a storage unit, information on at least one of a shared key for tracing which is an original shared key and a massage for tracing which is an original message, distribution member set data containing information on identification numbers different for each of the decryption devices, a public key, and a threshold serving as a reference for determining an unauthorized person, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver;
generating a ciphertext for tracing which, when the unauthorized processing is carried out, cannot output a correct shared key or message with a significant probability, using the public key;
obtaining, when the ciphertext for tracing is generated, a sum of data for a number of members who do not belong to the distribution member set;
transmitting a plurality of the ciphertexts for tracing to the respective decryption devices;
calculating, when a plurality of either one of shared keys and messages are received from the decryption devices, probabilities that each of the plurality of received shared keys and the shared key for tracing match or probabilities that each of the plurality of received messages and the message for tracing match; and
determining whether a difference in the probabilities between the decryption devices having successive identification numbers is smaller than the threshold, and determining that the decryption devices with a probability larger than the threshold is to be disabled.

9. A method of disabling an unauthorized person according to claim 8, further comprising:
storing a trace key along with the public key in the storage unit; and
generating the ciphertext for tracing using the public key and the trace key.

10. A non-transitory computer-readable recording medium having recorded thereon a program executed on a computer for distributing a ciphertext to a decryption device owned by a registered member, the program causing the computer to carry out the processing of:
storing, when distribution member set data, a random number, and a public key are input, the input information, the distribution member set data being information on members who are the registered members and are permitted to decrypt the ciphertext, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver; and
generating, when at least one of a shared key and a message is input, an error-containing ciphertext which is a ciphertext containing the shared key or the message, the distribution member set data, and error information which is information different for each of the members, and an error-correcting ciphertext which is a ciphertext of the error information, and obtaining, when the error-containing ciphertext is generated, a sum of data for a number of members who do not belong to the distribution member set.

11. A non-transitory computer-readable recording medium having recorded thereon a program executed on a computer for decrypting a ciphertext received from an outside, the program causing the computer to carry out the processing of:
storing, when a public key and a secret key corresponding to a decryption device are input, the input information, the public key including $[\theta_k \alpha^i]G$ obtained by multiplying G which is an element of an arbitrary additive cyclic group whose order is a composite number and is a generator of the cyclic group by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver;
determining, when an error-containing ciphertext containing information on at least one of a shared key and a message, error information which is different for each of a plurality of registered decryption devices, and corresponds to the decryption device, and distribution member set data which is information on members who are permitted to decrypt the ciphertext, and an error-correcting ciphertext which is a ciphertext of the error information are input, whether the decryption device is included in the distribution member set data;

decrypting, when the decryption device is included in the distribution member set data, the error-containing ciphertext and the error-correcting ciphertext with the public key and the secret key;

obtaining, when the error-containing ciphertext is decrypted, a sum of data for a number of members who do not belong to the distribution member set; and removing the error information from the decrypted error-containing ciphertext to output the shared key or the message.

12. A non-transitory computer-readable recording medium having recorded thereon a program executed on a computer for identifying a decryption device, which carries out unauthorized processing, of decryption devices owned by registered members, the program causing the computer to carry out the processing of:

storing, in a storage unit, information on at least one of a shared key for tracing which is an original shared key and a massage for tracing which is an original message, distribution member set data containing information on identification numbers different for each of the decryption devices, a public key, and a threshold serving as a reference for determining an unauthorized person, the public key including $[\theta_k \alpha^i]G$ obtained by multiplying G which is an element of an arbitrary additive cyclic group whose order is a composite number and is a generator of the cyclic group, by $\theta_k \alpha^i$ which is a product of $\theta_k$ and $\alpha^i$, where $\theta_k$ is an integer randomly generated for every k, k is any integer from 1 to L, L is an arbitrary integer, $\alpha^i$ is the i-th power of a constant integer $\alpha$ (i is any integer from 1 to 2L), and each of combinations (k, i) corresponds to a different receiver;

generating a ciphertext for tracing which, when the unauthorized processing is carried out, cannot output a correct shared key or message with a significant probability, using the public key;

obtaining, when the ciphertext for tracing is generated, a sum of data for a number of members who do not belong to the distribution member set;

transmitting a plurality of the ciphertexts for tracing to the respective decryption devices;

calculating, when a plurality of shared keys or messages are received from the decryption devices, probabilities that each of the plurality of received shared keys and the shared key for tracing match or probabilities that each of the plurality of received messages and the message for tracing match; and determining whether a difference in the probabilities between the decryption devices having successive identification numbers is smaller than the threshold, and determining that the decryption devices with a probability larger than the threshold is to be disabled.

13. The non-transitory computer-readable recording medium according to claim 12, wherein the program causes the computer to further carry out the processing of:

storing a trace key along with the public key in the storage unit; and generating the ciphertext for tracing using the public key and the trace key.

* * * * *

UNITED STATES PATENT AND TRADEMARK OFFICE
CERTIFICATE OF CORRECTION

PATENT NO. : 8,270,613 B2
APPLICATION NO. : 12/302734
DATED : September 18, 2012
INVENTOR(S) : Furukawa et al.

Page 1 of 1

It is certified that error appears in the above-identified patent and that said Letters Patent is hereby corrected as shown below:

In the Specification

Column 5, Line 46: Delete "massage" and insert -- message --

Column 11, Line 6: Delete "K'502:" and insert -- K' 502 --

Column 13, Line 22: Delete "massage" and insert -- message --

Column 14, Line 41: Delete "$e'_J$," and insert -- $e'_j$, --

Column 14, Line 42: Delete "$t'_J)_{j=1}$," and insert -- $t'_j)_{j=1}$, --

Column 14, Line 56: Delete "$\{(\sigma_j T\}$," and insert -- $\{\sigma_j T\}$, --

Column 14, Line 66: Delete "$i \leq I$," and insert -- $i \geq I$, --

Column 17, Line 38: Delete "$(D_j)_{j=1}$," and insert -- $(D'_j)_{j=1}$, --

Column 19, Line 4: Delete "K'502:" and insert -- K' 502: --

Column 20, Line 22: Delete "$R'j$," and insert -- $R'_j$, --

In the Claims

Column 28, Line 15: Claim 4, after "any" delete "of"

Column 29, Line 47: Claim 8, delete "massage" and insert -- message --

Column 31, Line 26: Claim 12, delete "massage" and insert -- message --

Signed and Sealed this
Twenty-third Day of December, 2014

Michelle K. Lee
*Deputy Director of the United States Patent and Trademark Office*